(12) United States Patent
Takano et al.

(10) Patent No.: US 10,890,840 B2
(45) Date of Patent: Jan. 12, 2021

(54) PROJECTION OPTICAL SYSTEM UNIT, PROJECTION OPTICAL SYSTEM, AND PROJECTION OPTICAL APPARATUS

(71) Applicants: Yohei Takano, Kanagawa (JP); Hirotoshi Nakayama, Kanagawa (JP)

(72) Inventors: Yohei Takano, Kanagawa (JP); Hirotoshi Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/355,765

(22) Filed: Mar. 17, 2019

(65) Prior Publication Data
US 2019/0285979 A1    Sep. 19, 2019

(30) Foreign Application Priority Data

Mar. 19, 2018 (JP) .................................. 2018-050356

(51) Int. Cl.
*G03B 21/28* (2006.01)
*G03B 21/00* (2006.01)
(Continued)

(52) U.S. Cl.
CPC ............. *G03B 21/28* (2013.01); *G02B 13/16* (2013.01); *G02B 26/0833* (2013.01); *G03B 21/008* (2013.01); *G03B 21/142* (2013.01)

(58) Field of Classification Search
CPC .... G03B 21/28; G03B 21/008; G03B 21/142; G02B 13/16; G02B 26/0833
See application file for complete search history.

(56) References Cited

U.S. PATENT DOCUMENTS

2006/0028739 A1* 2/2006 Kreitzer ................ G02B 13/16
359/754
2006/0028741 A1* 2/2006 Kreitzer ................ G02B 13/16
359/793
(Continued)

FOREIGN PATENT DOCUMENTS

CN        1906519 A     1/2007
CN      101557466 A    10/2009
(Continued)

OTHER PUBLICATIONS

Extended European Search Report dated Aug. 21, 2019 in corresponding European Patent Application No. 19161381.9, 6 pages.
(Continued)

*Primary Examiner* — Michelle M Iacoletti
*Assistant Examiner* — Magda Cruz
(74) *Attorney, Agent, or Firm* — Oblon, McClelland, Maier & Neustadt, L.L.P.

(57) ABSTRACT

A projection optical system satisfies $\theta1 \geq 15$ (deg) and $3<EP/Ym<7$. $\theta1$ is a maximum inclination angle of the reflective surface of each of the micromirrors with respect to the line normal to the image display surface; EP is an entrance pupil distance of the projection optical system; and Ym is a maximum distance in a plane from an optical axis to a point on the image display surface, the plane being a plane in which a light ray propagating from a center of the image display surface toward the projection surface through a center of an aperture stop of the projection optical system exists, the optical axis being an axis shared by a largest number of the plurality of lenses of the projection optical system, the point corresponding to an image on the projection surface.

18 Claims, 12 Drawing Sheets

(51) Int. Cl.
    *G02B 26/08*     (2006.01)
    *G03B 21/14*     (2006.01)
    *G02B 13/16*     (2006.01)

(56) References Cited

U.S. PATENT DOCUMENTS

| | | | |
|---|---|---|---|
| 2007/0184368 A1* | 8/2007 | Nishikawa | G02B 17/08 430/30 |
| 2009/0059185 A1 | 3/2009 | Hisada et al. | |
| 2009/0257117 A1* | 10/2009 | Baba | G02B 13/16 359/364 |
| 2012/0019791 A1* | 1/2012 | Abe | G03B 21/28 353/99 |
| 2012/0154768 A1 | 6/2012 | Tatsuno | |
| 2012/0162753 A1 | 6/2012 | Tatsuno | |
| 2013/0070217 A1 | 3/2013 | Tatsuno | |
| 2013/0107232 A1 | 5/2013 | Tatsuno | |
| 2013/0107233 A1 | 5/2013 | Hirakawa et al. | |
| 2013/0107234 A1 | 5/2013 | Nishina et al. | |
| 2013/0235356 A1 | 9/2013 | Takahashi et al. | |
| 2014/0118818 A1 | 5/2014 | Nishina et al. | |
| 2014/0126045 A1 | 5/2014 | Tatsuno et al. | |
| 2014/0146295 A1 | 5/2014 | Tatsuno | |
| 2014/0185145 A1 | 7/2014 | Takano et al. | |
| 2014/0204351 A1* | 7/2014 | Matsuo | G02B 13/16 353/98 |
| 2014/0218699 A1 | 8/2014 | Tatsuno | |
| 2014/0268073 A1 | 9/2014 | Takano | |
| 2014/0340658 A1 | 11/2014 | Takano et al. | |
| 2015/0062696 A1 | 3/2015 | Tatsuno et al. | |
| 2015/0138625 A1 | 5/2015 | Tatsuno | |
| 2015/0234158 A1 | 8/2015 | Tatsuno et al. | |
| 2015/0370048 A1 | 12/2015 | Takano | |
| 2016/0077420 A1 | 3/2016 | Tatsuno | |
| 2016/0091700 A1 | 3/2016 | Takano | |
| 2016/0103304 A1 | 4/2016 | Takano et al. | |
| 2016/0231542 A1 | 8/2016 | Tatsuno et al. | |
| 2016/0274344 A1* | 9/2016 | Lin | G02B 17/0856 |
| 2017/0059836 A1 | 3/2017 | Takano | |
| 2017/0059971 A1 | 3/2017 | Takano et al. | |
| 2017/0064268 A1 | 3/2017 | Shibayama et al. | |
| 2017/0293125 A1 | 10/2017 | Takano | |
| 2017/0299959 A1 | 10/2017 | Huang | |
| 2018/0003928 A1 | 1/2018 | Tatsuno et al. | |
| 2018/0003934 A1 | 1/2018 | Takano et al. | |
| 2018/0003964 A1 | 1/2018 | Tatsuno | |
| 2018/0074302 A1 | 3/2018 | Takano et al. | |

FOREIGN PATENT DOCUMENTS

| | | |
|---|---|---|
| CN | 102150068 A | 8/2011 |
| CN | 102346303 A | 2/2012 |
| CN | 102629082 A | 8/2012 |
| CN | 102681357 A | 9/2012 |
| CN | 103091820 A | 5/2013 |
| EP | 2 597 515 A1 | 5/2013 |
| JP | 2003-202492 A | 7/2003 |
| JP | 2006-209150 A | 8/2006 |
| JP | 2007-079524 | 3/2007 |
| JP | 2009-251458 | 10/2009 |
| JP | 2010-78627 A | 4/2010 |
| JP | 2011-242606 | 12/2011 |
| JP | 2012-203139 | 10/2012 |
| JP | 2013-3297 A | 1/2013 |

OTHER PUBLICATIONS

Office Action dated Nov. 4, 2020 in Chinese Application No. 201910145042.7.

\* cited by examiner

PROJECTION OPTICAL SYSTEM UNIT, PROJECTION OPTICAL SYSTEM, AND PROJECTION OPTICAL APPARATUS

CROSS-REFERENCE TO RELATED APPLICATION

This patent application is based on and claims priority pursuant to 35 U.S.C. § 119(a) to Japanese Patent Application No. 2018-050356, filed on Mar. 19, 2018 in the Japan Patent Office, the entire disclosure of which is hereby incorporated by reference herein.

BACKGROUND

Technical Field

Embodiments of the present disclosure relate to a projection optical system unit, a projection optical system, and a projection optical apparatus.

Description of the Related Art

In recent years, image display elements that project an image generated by a digital micromirror device (DMD) or a liquid crystal panel onto a screen are widely used. In particular, recently, demand for front-projection projectors that can display a large image at a short projection distance has been increasing.

In order to achieve a very short projection distance with a small size, projectors employing a curved mirror have been proposed. Some of the projectors can achieve a very short projection distance by employing a curved mirror in combination with a refractive optical system.

SUMMARY

However, existing technologies have a problem in that, even if it is possible to realize a very short projection distance with a projection optical system, reduction in size and increase in brightness (increase in efficiency) of a very short projection distance projector do not sufficiently proceed.

The embodiments of the present disclosure have been made in consideration of the above circumstances, and an object of the present invention is to provide a projection optical system, a projection optical system unit, and a projection optical apparatus, each of which has a very short projection distance, a small size, and high efficiency.

A projection optical system according to a first aspect of the invention, for use in a projection optical apparatus, includes a reflective image display element that includes a plurality of micromirrors. The image display element has an image display surface on which the plurality of micromirrors are two-dimensionally arranged and is configured to change an angle of a reflective surface of each of the micromirrors with respect to a line normal to the image display surface to form an image. The projection optical system includes a plurality of lenses and an aperture stop and is configured to magnify and project an image formed by the image display element onto a projection surface. The projection optical system satisfies $\theta1 \geq 15$ (deg) and $3 < EP/Ym < 7$, where $\theta1$ is a maximum inclination angle of the reflective surface of each of the micromirrors with respect to the line normal to the image display surface; EP is an entrance pupil distance of the projection optical system; and Ym is a maximum distance in a plane from an optical axis to a point on the image display surface, the plane being a plane in which a light ray propagating from a center of the image display surface toward the projection surface through a center of the aperture stop of the projection optical system exists, the optical axis being an axis shared by a largest number of the plurality of lenses of the projection optical system, the point corresponding to an image on the projection surface.

A projection optical system unit according to a second aspect of the invention includes: a reflective image display element that includes a plurality of micromirrors, the image display element having an image display surface on which the plurality of micromirrors are two-dimensionally arranged and being configured to change an angle of a reflective surface of each of the micromirrors with respect to a line normal to the image display surface to form an image; and the projection optical system according to the first aspect.

A projection optical apparatus according to a third aspect of the invention, for magnifying and projecting an image onto a screen, includes the projection optical system according to the first aspect.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1A:
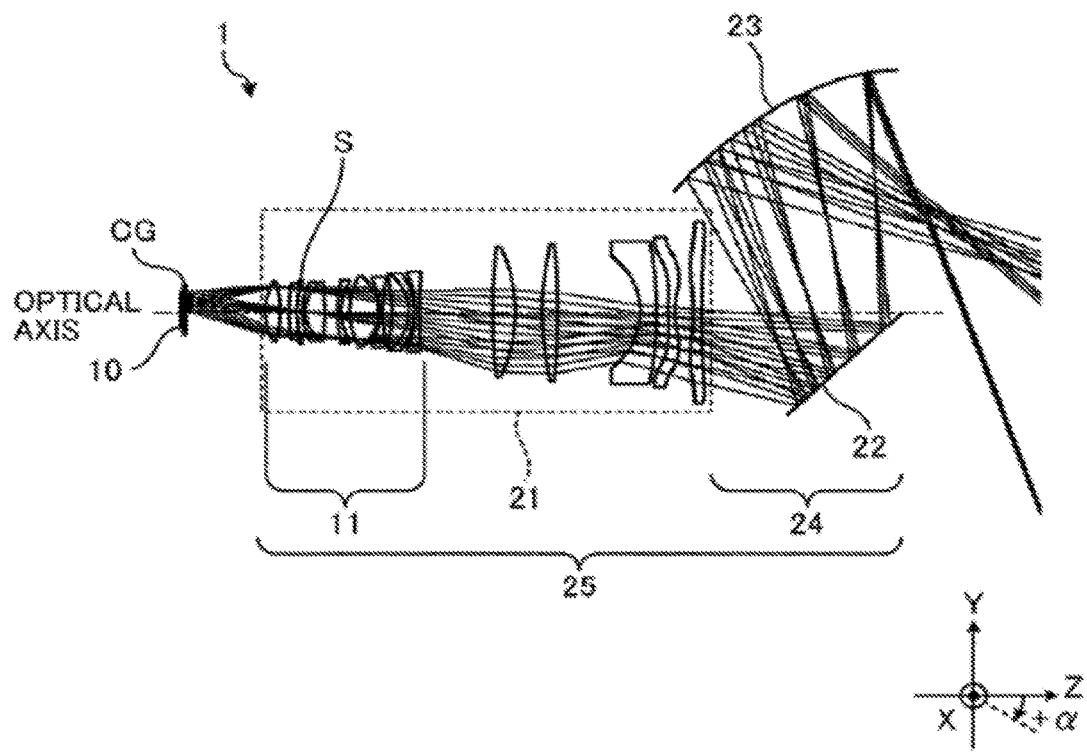
FIGS. 1A and 1B illustrate an example of a projection optical system unit according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a projection optical system unit, a projection optical system, and a projection optical apparatus will be described in detail with reference to the drawings.

In order to realize a smaller optical system having high efficiency (high brightness), it is effective to reduce the F-number of a projection optical system and to make the projection optical system into a non-telecentric optical system. It is possible to use a non-telecentric optical system as a projection optical system by using a digital micromirror device (DMD) as an image display element. However, the following problems occur in a case of realizing reduction in size and increase in efficiency of a very short projection distance projector.

First, a DMD operates in such a way that micromirrors of pixels are inclined as the pixels are switched between ON and OFF and light reflected by micromirrors in the ON-state is guided to the projection optical system. However, by simply reducing the F-number of the projection optical system in order to realize increase in efficiency, light reflected by micromirrors in the OFF-state is also guided to the projection optical system when the inclination angles of the micromirrors are small, and a problem arises in that the contrast of a projected image considerably decreases.

Second, the size of the projection optical system can be further reduced by reducing the entrance pupil distance of a pupil on the DMD side. However, regarding increase in efficiency, by simply increasing the inclination angles of micromirrors to solve the first problem, the incident angle of illumination light on a cover glass of the DMD increases, transmittance considerably decreases, and efficiency decreases.

The inventors have focused on the relationship between the inclination angles of micromirrors and the entrance pupil distance in realizing reduction in size and increase in efficiency (increase in brightness) of an optical system. The inventors have examined this relationship in various ways and found appropriate settings that have not been disclosed as existing technology. Hereinafter, the structure of an optical system including the appropriate settings will be described.

First Embodiment

Specific structures of a projection optical system unit according to a first embodiment will be described.

Figure 1B:
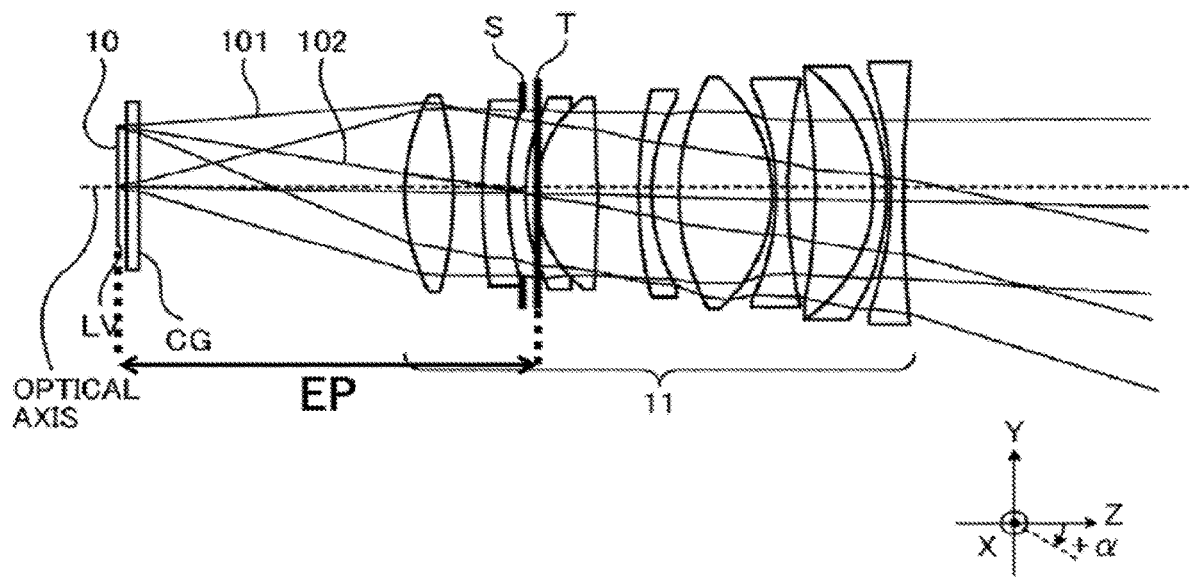

FIGS. 1A and 1B illustrate an example of a projection optical system unit according to the first embodiment. FIG. 1A illustrates an example of the structure of a projection optical system unit 1 including an image display element 10 and a projection optical system 25. FIG. 1B is an enlarged view of the image display element 10 illustrated in FIG. 1A and a plurality of lenses 11 included in a refractive optical system 21 of the projection optical system 25. The image display element 10 includes an image forming portion LV, which is, for example, a light valve such as a DMD, a transmissive liquid crystal panel, or a reflective liquid crystal panel. The image forming portion LV is a "portion that forms an image to be projected". If the image display element 10 is an element that does not emit light, such as a DMD, image information formed in the image forming portion LV is illuminated with illumination light from an illumination optical system. Specific structures of the illumination optical system will be described below.

Hereinafter, it is supposed that the image display element 10 is a DMD, and an "element that does not have a function of emitting light" will be described. A projection optical system unit according to the present embodiment is not limited to a unit of this type. A "self-luminous element that has a function of causing a generated image to emit light" or a light valve other than a DMD may be used. As long as the projection optical system unit includes a combination of the image display element 10 and the projection optical system 25, the combination may further include an illumination device, a mirror, a dustproof glass, and the like, which will be described below.

As illustrated in FIGS. 1A and 1B, a parallel plate CG is disposed near the image forming portion LV (see FIG. 1B) of the image display element 10. The parallel plate CG is a light transmissive plate and is a cover glass (seal glass) of the image forming portion LV. The projection optical system 25 (see FIG. 1A) magnifies an image formed by the image forming portion LV and projects the image onto a screen. The projection optical system 25 includes, in order from the image forming portion LV (reduction side) toward the screen (magnification side), the refractive optical system 21, including the plurality of lenses 11, and a reflective optical system 24, including a reflective surface having power. The plurality of lenses 11 illustrated in FIGS. 1A and 1B have an aperture stop S. Light from the image forming portion LV (including an upper ray 101 and a chief ray 102), which has passed through the parallel plate CG, passes through the plurality of lenses 11 along a light path whose example is illustrated in FIGS. 1A and 1B. Then, the light passes through the refractive optical system 21 and is projected onto a screen via the reflective optical system 24 that includes a reflecting mirror 22 and a curved mirror 23. The projection optical system unit according to the embodiment has an entrance pupil T at a position illustrated in FIGS. 1A and 1B.

It is desirable that the aperture stop S be interposed between at least two lenses. By disposing the aperture stop S in this way, a back focus can be reduced while maintaining a sufficient pupil distance, and the reduction in back focus contributes to reduction is size. By disposing a lens on the image display element 10 side of the aperture stop S, the upper ray 101 can controlled, and correction of aberration, such as coma correction, can be efficiently performed.

The meanings of symbols used in the present embodiment are as follows.

NA: numerical aperture
R: radius of curvature (for an aspheric surface, paraxial radius of curvature)
D: surface distance
Nd: refractive index
vd: Abbe number
K: conic constant of aspheric surface
Ai: i-th order aspheric constant
Cj: free-form surface coefficient Here, a relational expression for an aspheric shape and a relational expression for a free surface shape will be described. An aspheric shape is represented by the following known formula:

$$X = \frac{C \cdot H^2}{1 + \sqrt{(1-(1+K) \cdot C^2 \cdot H^2)}} + \sum_{i=1} Ai \cdot H^i \quad (1)$$

where X is the aspheric amount in the optical axis direction, C is the reciprocal of the paraxial radius of curvature (paraxial curvature), H is the height from the optical axis, K is the conic constant, and Ai is the i-th order aspheric constant.

The aspheric shape is specified by giving the paraxial radius of curvature, the conic constant, and the aspheric coefficients to this formula.

The free-form surface shape is represented by the following known formula:

$$X = \frac{C \cdot H^2}{1 + \sqrt{(1-(1+K) \cdot C^2 \cdot H^2)}} + \sum_{j=1} Cj \cdot x^m y^n \quad (2)$$

where X is the free-form surface amount in the optical axis direction, C is the reciprocal of the paraxial radius of curvature (paraxial curvature), H is the height from the optical axis, K is the conic constant, and Cj is the free-form surface coefficient.

Here, $$j = \frac{(m+n)^2 + m + 3n}{2} + 1 \quad (3)$$

The free-form surface shape is specified by giving the paraxial radius of curvature, the conic constant, and the free-form surface coefficients to this formula.

In FIGS. 1A and 1B, a Z-axis, a Y-axis, and an X-axis are set. The Z-axis extends in a direction normal to the image forming portion LV. The Z-axis is parallel to an axis (referred to as the "optical axis") that is shared by a large number of optical devices (the majority of axially symmetric lenses) of the refractive optical system including the plurality of lenses 11. The X-axis, the Y-axis, and the Z-axis are perpendicular to each other. A rotational direction illustrated in FIG. 1B will be referred to as the +α direction.

Figure 2:
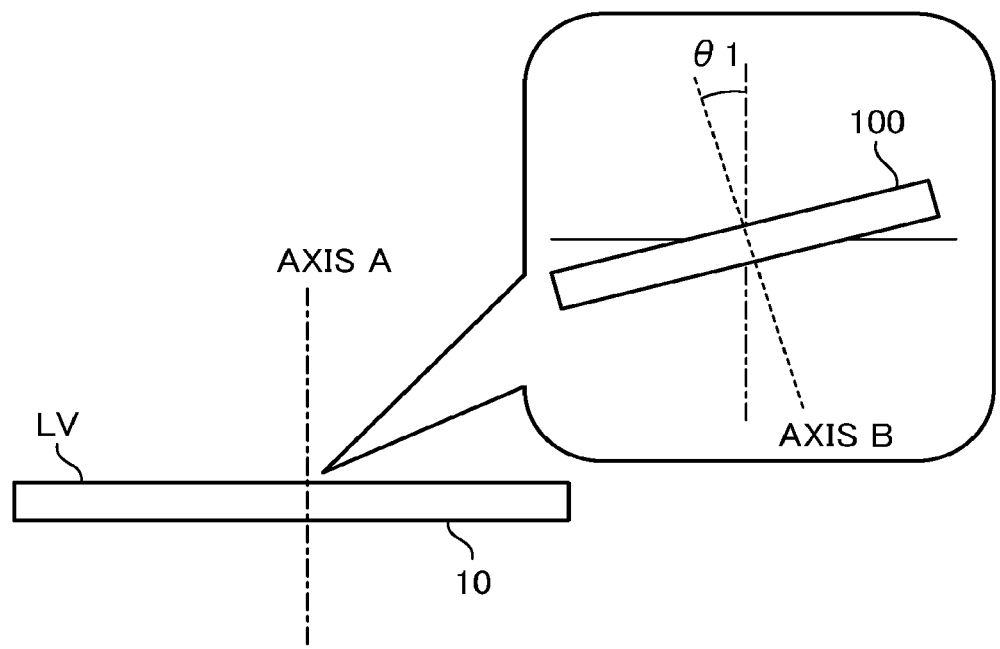
FIG. 2 is a schematic view of an image display element.

FIG. 2 is a schematic view of the image display element 10. A large number of micromirrors are disposed in the image forming portion LV of the image display element 10. The micromirrors are two-dimensionally and regularly arranged on a flat surface (image display surface) of the image display element 10. Each of the micromirrors creates an ON-state or an OFF-state in accordance with the inclination of the micromirror. That is, the image display element 10 is a reflective image display element that forms an image by operating the micromirrors.

FIG. 2 is an enlarged view of a micromirror 100, which is one of a large number of micromirrors. In FIG. 2, the maximum inclination angle θ1 of the micromirror 100 is defined as the maximum angle of an axis B with respect to an axis A, where the axis A is an axis extending in a direction normal to the image display surface of the image forming portion LV (normal line axis), and the axis B is an axis extending in a direction normal to the reflective surface of the micromirror 100. That is, the maximum inclination angle θ1 is the maximum inclination angle of the axis B with respect to the axis A when the micromirror is in the ON-state.

The inventors have found by experiment that it is desirable that the maximum inclination angle θ1 satisfy the following conditional expression.

$$\theta 1 \geq 15 [deg] \quad (1)$$

The conditional expression (1) represents the optimal range of the maximum inclination angle θ1 of each micromirror. If the maximum inclination angle θ1 is smaller than the lower limit of the conditional expression (1), it is not possible to reduce the F-number of the projection optical system and to efficiently use light from a light source. Therefore, the optimal range of the maximum inclination angle θ1 is given by the conditional expression (1).

Next, conditions on EP/Ym will be described. The image forming portion LV is shifted in the Y-axis direction with respect to the optical axis that is shared by the plurality of lenses 11 of the refractive optical system.

Figure 3:
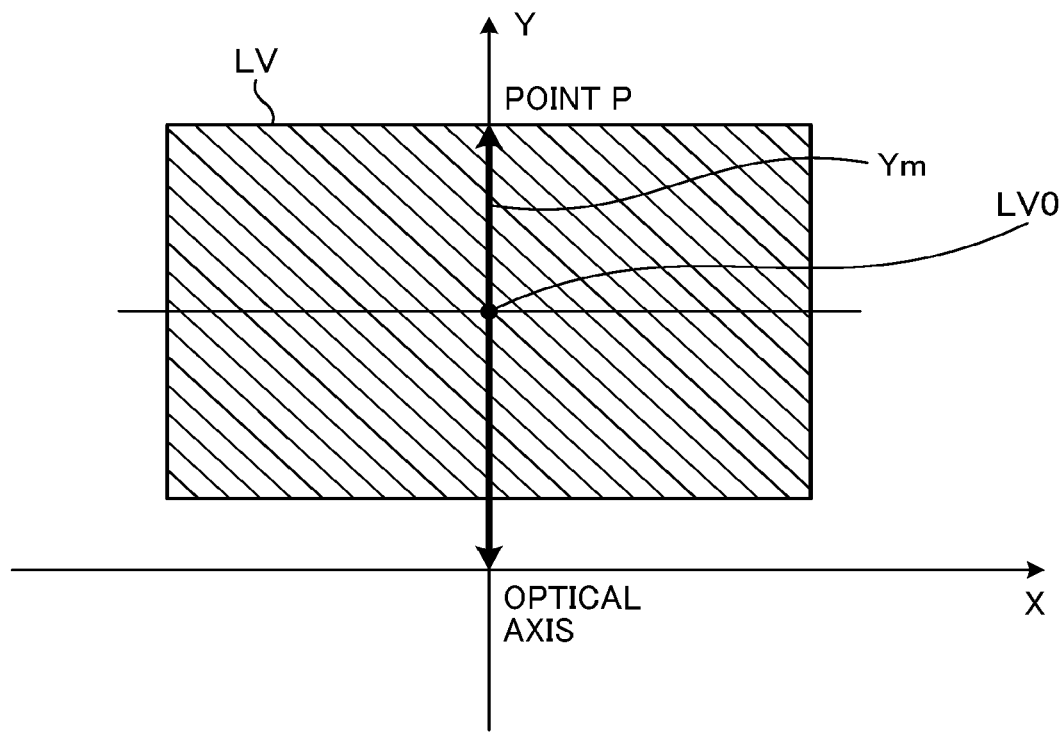
FIG. 3 illustrates the positional relationship between an image forming portion and an optical axis.

FIG. 3 illustrates the positional relationship between the image forming portion and the optical axis. FIG. 3 illustrates an XY-plane (defined as "plane C") in which a light ray propagating from the center LV0 of the image forming portion LV (accordingly, the center of the image display surface) through the center of the aperture stop S toward a projection surface exists. Ym denotes the maximum distance from the optical axis to a point on the image display surface corresponding to an image on the projection surface.

As illustrated in FIG. 1B, a pupil of the projection optical system 25 on the image forming portion LV side is the entrance pupil T, and EP denotes the distance from the image forming portion LV to the entrance pupil T along the optical axis.

Figure 4:
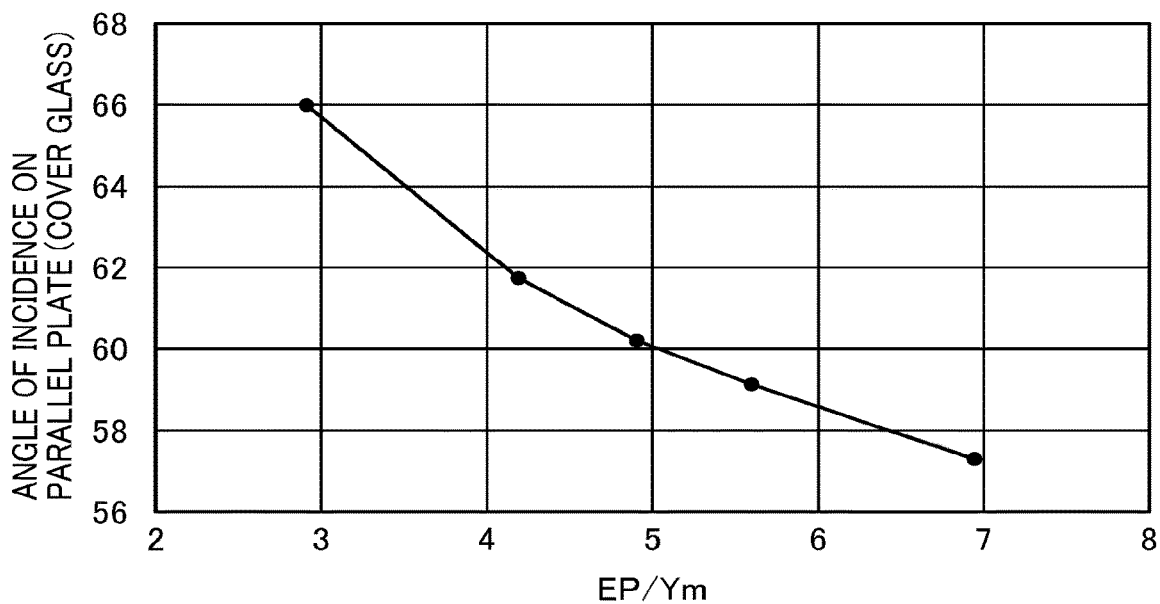
FIG. 4 is graph representing an example of the relationship between EP/Ym and the maximum incident angle of a light ray on a parallel plate.

FIG. 4 is a graph representing an example of the relationship between EP/Ym and the maximum incident angle of a light ray on the parallel plate CG. Values of the data change in accordance with conditions such as evenness of illumination on the image forming portion LV, the shift amount of each micromirror 100, and the like. Therefore, FIG. 4 illustrates an example the relationship between these. When a general antireflection film is used for the parallel plate CG, transmittance of light sharply decreases as the incident angle of light on the parallel plate CG exceeds 65 degrees (deg). Therefore, it is desirable to set EP/Ym at a value such that the incident angle becomes 65 deg or smaller. Based on the data represented in FIG. 4 and the like, the inventors have found that it is desirable that EP/Ym satisfy the following conditional expression.

$$3 < EP/Ym < 7 \qquad (2)$$

The conditional expression (2) represents an appropriate range of the entrance pupil distance. If EP/Ym becomes smaller than the lower limit value of the conditional expression (2), the incident angle of light from each micromirror 100 to the parallel plate CG increases, reflectance at the surface of the parallel plate CG increases, and efficiency decreases. If EP/Ym becomes larger than the upper limit value, although efficiency increases because the incident angle of illumination light on the parallel plate CG decreases, the size of the projection optical system increases.

Thus, when the conditional expressions (1) and (2) are simultaneously satisfied, a small and high-efficiency projection optical apparatus can be realized, and it is possible to reduce size and increase efficiency even if the projection distance is very short.

It is more desirable that the range of EP/Y satisfy the following conditional expression.

$$4 < EP/Y < 7 \qquad (2')$$

Second Embodiment

Next, a projection optical apparatus according to a second embodiment will be described. The projection optical apparatus includes the projection optical system unit according to the first embodiment. Therefore, in the second embodiment, descriptions of portions that are same as those of the first embodiment will be omitted, as appropriate, and, differences from the first embodiment will be mainly described.

Figure 5:
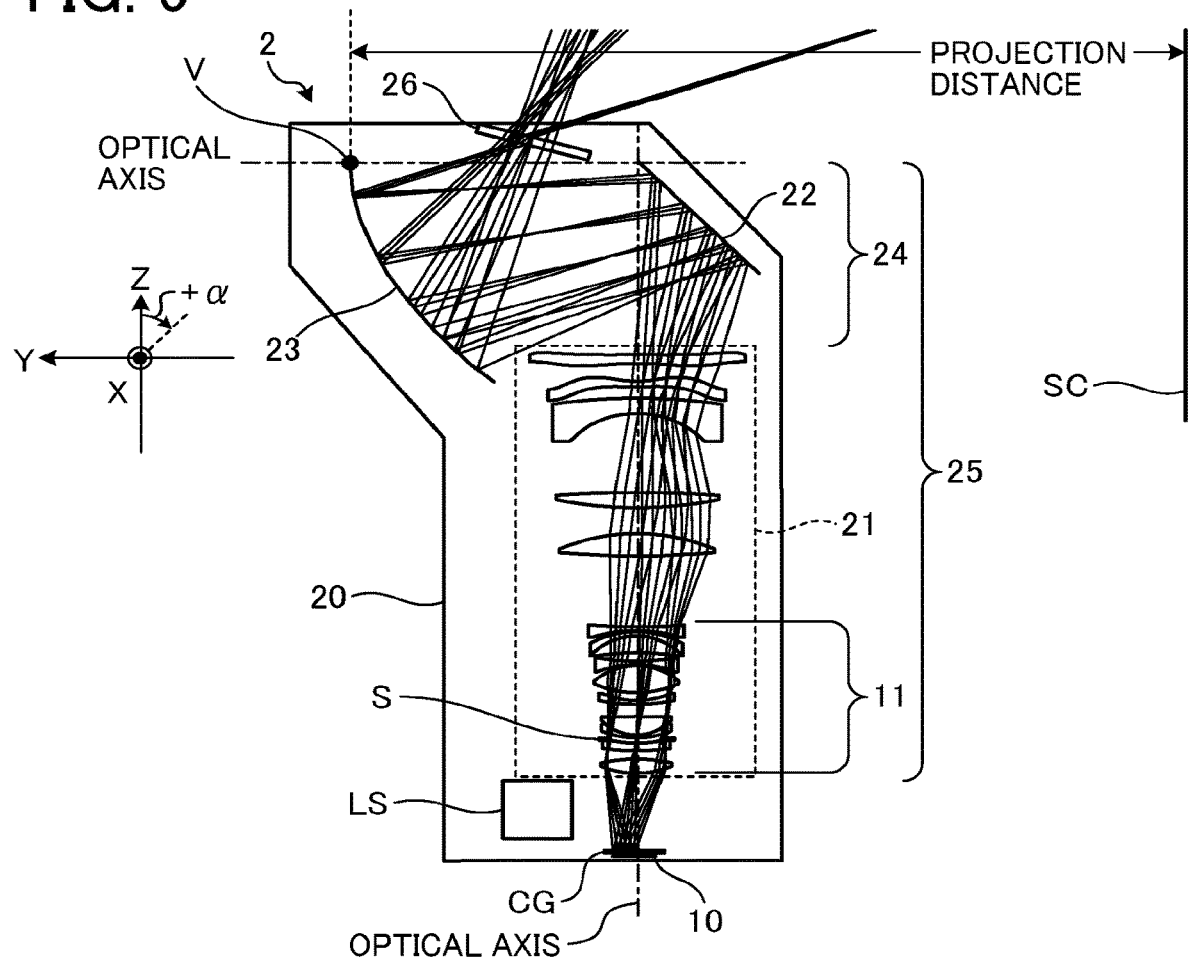
FIG. 5 illustrates an example of a projection optical apparatus according to a second embodiment.

FIG. 5 illustrates an example of a projection optical apparatus according to the second embodiment. FIG. 5 illustrates the internal structure of the projection optical apparatus.

A projection optical apparatus 2 illustrated in FIG. 5 includes, in a housing 20, an illumination optical system LS, the image display element 10, the parallel plate CG, the projection optical system 25, and a dustproof glass 26. The projection optical system 25 includes the refractive optical system 21, and the reflective optical system 24 including a plane mirror (reflective surface) 22 and a concave mirror 23. In the refractive optical system 21, a lens arrangement in a case of projecting a 100-inch image is illustrated, and a light path in this case is illustrated.

Figure 6:
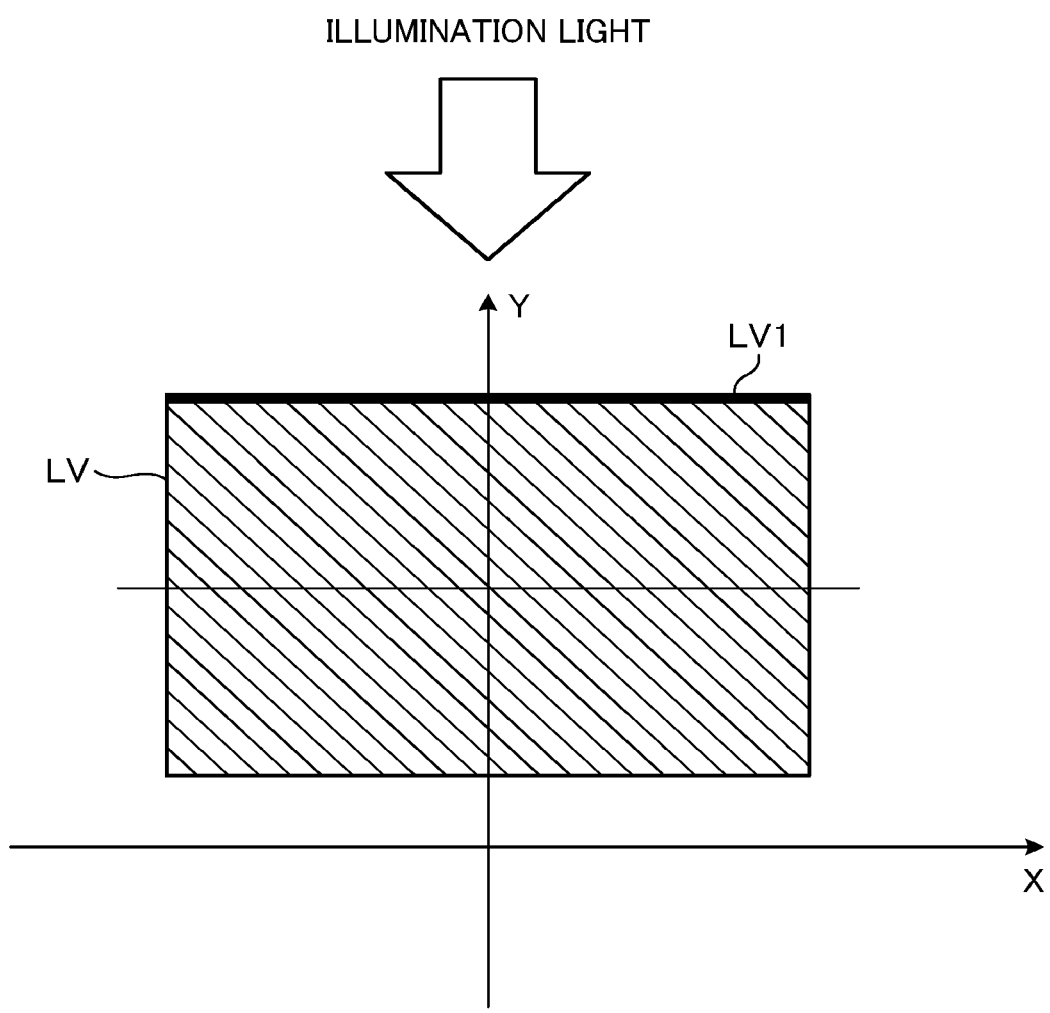
FIG. 6 illustrates an example of an incident direction of illumination light with respect to the image forming portion in the XY-plane.
Figure 7:
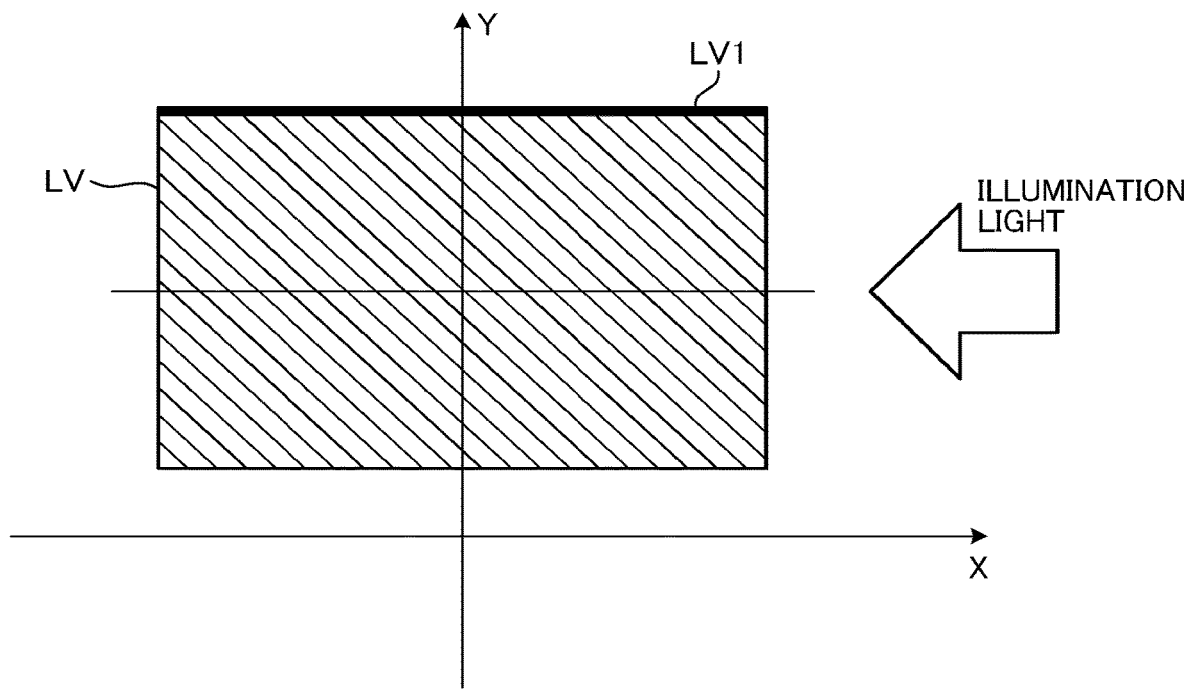
FIG. 7 illustrates another example of an incident direction of illumination light with respect to the image forming portion in the XY-plane.
Figure 8:
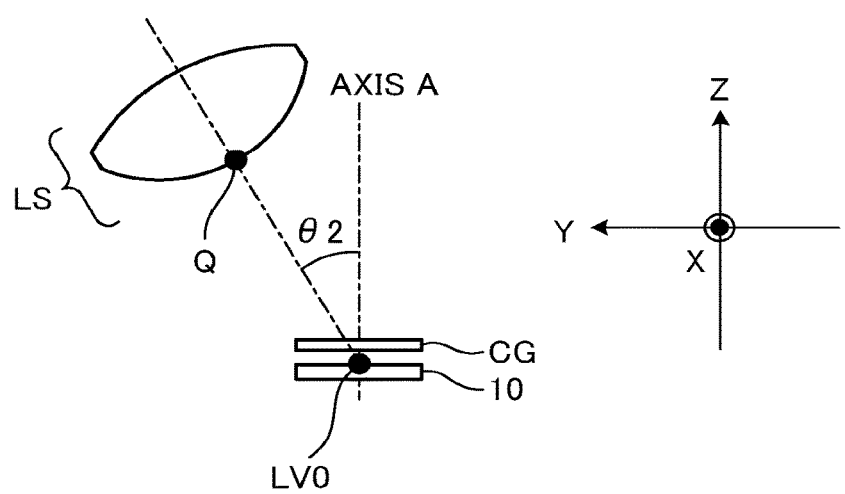
FIG. 8 illustrates an incident direction of illumination light in the YZ-plane.

Referring to FIGS. 6 to 8, an incident direction of illumination light on the image forming portion LV of the image display element 10 will be described. As described in the first embodiment, the optical elements of the refractive optical system 21 share the optical axis, and the position of the image forming portion LV is shifted in the Y-axis direction as viewed from the optical axis (see FIG. 3). The direction of illumination light with respect to the image forming portion LV is considered to be as follows.

FIG. 6 illustrates an example of the incident direction of illumination light with respect to the image forming portion LV in the XY-plane. FIG. 6 illustrates the structure of a so-called "bottom illumination" structure, with which illumination light is incident in a direction perpendicular to a long side LV1 of the image forming portion LV.

FIG. 7 illustrates another example of the incident direction of illumination light with respect to the image forming portion LV in the XY-plane. FIG. 7 illustrates a so-called "side illumination" structure, with which illumination light is incident in a direction parallel to the long side LV1 of the image forming portion LV.

FIG. 8 illustrates an incident direction of illumination light in the YZ-plane. A surface vertex Q is defined as a vertex of a surface, which is nearest to the image forming portion LV side, of an optical element of the illumination optical system LS having power. θ2 is defined as the angle between a straight line connecting the surface vertex Q and the center LV0 of the image forming portion LV and the axis A in the direction normal to the image forming portion LV.

The inventors have found by experiment that it is further desirable that θ2 satisfy the following conditional expression.

$$\theta 2 > 30 [\deg] \qquad (3)$$

When illumination light that illuminates the image forming portion LV is incident in a direction perpendicular to or parallel to the long side LV1 of the image forming portion LV, if the angle θ2 satisfies the conditional expression (3), light reflected by each micromirror in the ON-state can be efficiently made to enter the entrance pupil T. For example, the size of the entirety of the optical system can be reduced, by allowing illumination light to be incident in the direction perpendicular to the long side LV1 of the image forming portion LV. The thickness of the entirety of the optical system can be reduced, by allowing illumination light to be incident in the direction parallel to the long side LV1 of the image forming portion LV.

Figure 9:
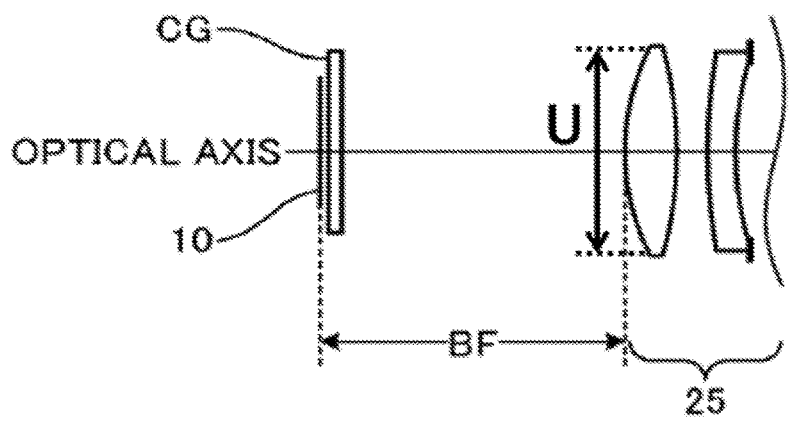
FIG. 9 illustrates an example of the distance between the vertex of a lens surface nearest to the image forming portion and the image forming portion along the optical axis.

The inventors have found by experiment that it is further desirable that the following conditional expression be satisfied:

$$0.35 < U/BF < 0.85 \qquad (4)$$

where BF is the distance between the vertex of a lens surface that is nearest to the image forming portion LV and the image forming portion LV along the optical axis (see FIG. 9), and U is the outside diameter of a lens that has the lens surface nearest to the image forming portion LV.

If the value of U/BF is smaller than the lower limit of the conditional expression (4), the amount of light reflected by the lens barrel increases, efficiency decreases, evenness of brightness on the screen SC is impaired, and temperature characteristics deteriorate because the lens barrel is heated. If the value of U/BF is larger than the upper limit of the conditional expression (4), although the amount of light taken into the image forming portion increases, interference between illumination light and the lens barrel becomes inevitable, efficiency decreases, and evenness of brightness on the screen SC is impaired. Therefore, it is desirable that the value of U/BF satisfy the conditional expression (4). It is more desirable that the value of U/BF satisfy the following conditional expression.

$$0.5 < U/BF < 0.8 \qquad (4')$$

The inventors have found by experiment that it is desirable that the following conditional expression be satisfied.

$$NA > 0.17 \qquad (5)$$

Light emitted from a light source propagates by way of the illumination optical system LS, is reflected by the image forming portion LV, passes through the parallel plate CG, and enters the entrance pupil T in the refractive optical system 21. It is desirable that the entrance pupil T be located away from the image forming portion LV by a lens. By increasing the distance between the entrance pupil T and the image forming portion LV, the incident angle of light on the parallel plate CG can be reduced, and decrease of efficiency can be suppressed. It is also possible to reduce the lens diameter.

It is more desirable that the value of NA satisfy the following condition.

$$NA > 0.18 \quad (5')$$

By increasing the numerical aperture of the projection optical system as in this conditional expression, light from the light source can be efficiently guided to the screen SC.

Because the present embodiment includes, in order from the image forming portion LV side, the refractive optical system 21 and at least one mirror having power, it is possible to project a large image at a very short distance.

Figure 10:
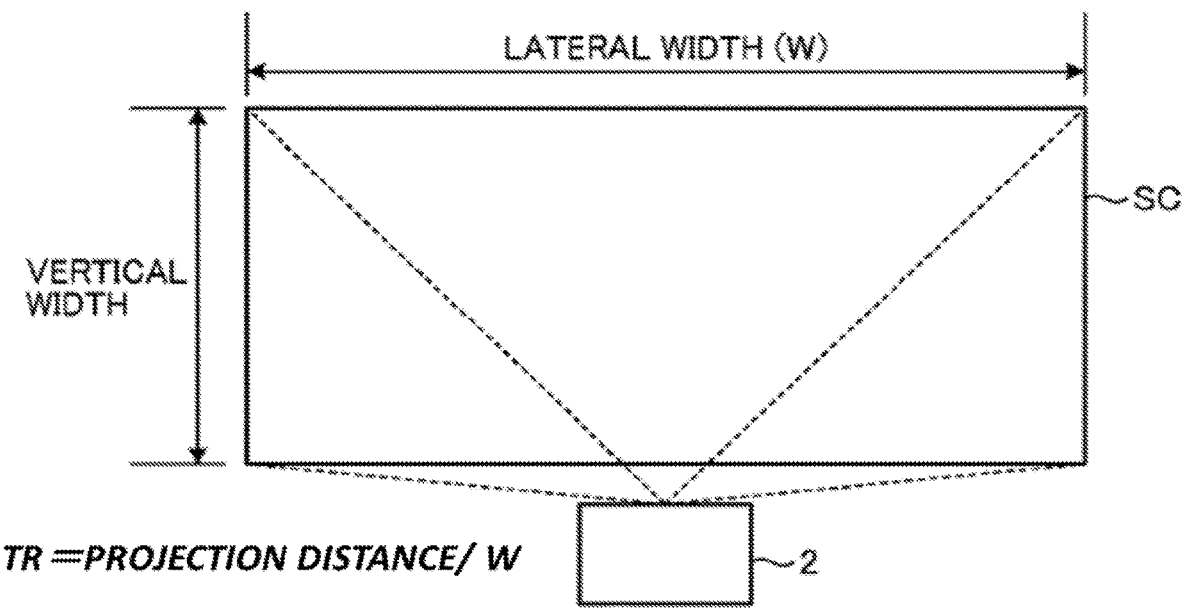
FIG. 10 illustrates an example of the lateral width of a screen.

The inventors have found by experiment that it is more desirable that the following conditional expression be satisfied:

$$TR < 0.5 \quad (6)$$

where TR (=(projection distance)/(lateral width W)), where the projection distance is defined as the distance from an optical surface that is nearest to the magnification side to the screen SC as illustrated in FIG. 5 and the lateral width W is defined as the lateral width of the screen SC as illustrated in FIG. 10.

If the value of TR satisfies the conditional expression (6), it is possible to perform projection from a very short distance. It is more desirable that the value of TR satisfy the following conditional expression.

$$TR < 0.35 \quad (6')$$

It is further desirable that the mirror having power be a concave mirror. By using a concave mirror, it is possible to perform projection from a very short distance.

It is further desirable that the concave mirror have a free-form surface shape. When the concave mirror has a free-form surface shape, it is possible to increase freedom in design and to reduce size.

It is further desirable that the dustproof glass 26 be disposed between the mirror having power and the screen SG, and reflection characteristics with respect to the incident angle on a coat of the dustproof glass 26 differ among regions. In this case, transmittance of light that is to reach a lower part of the screen is improved.

Figure 11:
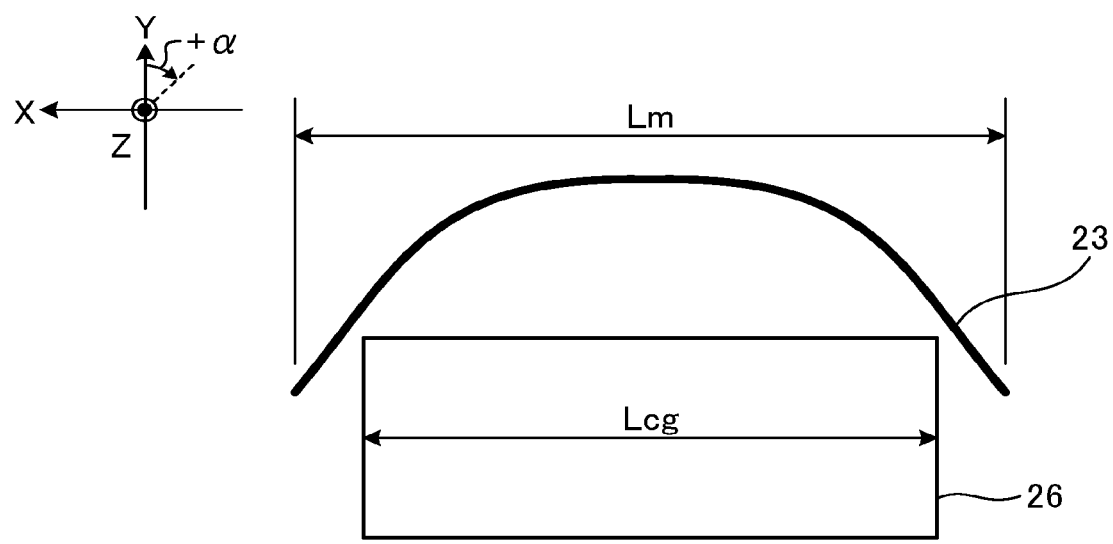
FIG. 11 illustrates an example of the length of a dustproof glass in the X-axis direction and an example of the length of a reflective surface having power in the X-axis direction.

The inventors have found by experiment that it is further desirable that the following conditional expression be satisfied:

$$0.5 < Lcg/Lm < 1.8 \quad (7)$$

where, as illustrated in FIG. 11, Lcg is the length of the dustproof glass 26 in the X-axis direction, and Lm is the length of the reflective surface having power in the X-axis direction.

If the value of Lcg/Lm is larger than the upper limit of the conditional expression (7), although it becomes easy to make the characteristics of the coat differ among regions, the size of the optical system increases. If the value of Lcg/Lm is smaller than the lower limit of the conditional expression (7), although the size of the optical system can be reduced, it becomes difficult to make the characteristics of the coat differ among regions. Therefore, it is desirable that the value of Lcg/Lm satisfy the conditional expression (7).

The projection optical apparatus includes at least one reflective surface between the refractive optical system 21 and the reflective surface having power. By bending the light path in this say, it is possible to make the light path to overlap, to alleviate conditions for interference between a light ray and an optical member, and to reduce size.

It is further desirable that a lens group, which is nearest to the image forming portion LV side, of the refractive optical system 21 have positive refractive power.

In the projection optical apparatus 2, although the refractive optical system 21, one plane mirror 22, and one concave mirror 23 are included in a system, it is possible to further increase mirrors. Increasing mirrors makes the structure complex and leads to increase in size and costs. Therefore, in consideration of reduction in size and costs, it is desirable to keep the number of mirrors small.

In the projection optical apparatus 2, the micromirror 100 of the image display element 10 each enter the ON-state or the OFF-state based on image information to two-dimensionally modulate the intensity of illumination light from the illumination optical system LS. The light from the micromirrors 100 passes through the parallel plate CG and forms a projection light beam of object light. The projection light beam passes the refractive optical system 21, the reflective surface 22, the concave mirror 23, and the dustproof glass 26 in this order and forms an image, and a magnified projection image is projected onto the screen SC.

The projection light beam, which has passed through the refractive optical system 21, is magnified and projected onto the screen SC while receiving, for example, the following effect. An intermediate image that is conjugate to an image formed in the image forming portion LV is formed as a spatial image on a light path on the image forming portion LV side of the concave mirror 23. Although the intermediate image is formed as a curved image in the present structure, the intermediate image may be formed as a planar image in accordance with the structure. The intermediate image is magnified and projected by the concave mirror 23, which is disposed nearest to the magnification side, and is projected onto the screen SC as a projection image.

In the present embodiment, the plane mirror 22 is disposed between the reflective surface having power (the concave mirror 23) and the refractive optical system 21 to form an optical system in which the light path is bent. In such an optical system, it is desirable to avoid interference between light reflected from the plane mirror 22 and the refractive optical system 21. Because a lens is disposed on the image forming portion LV side of the aperture stop S, the upper ray 101 can be cut, interference between light reflected by the plane mirror 22 and the refractive optical system 21 can be avoided, and size can be further reduced.

In the present embodiment, the concave mirror 23 having a free-form surface is used as an example. The term "free-form surface" refers to an anamorphic surface such that curvature in the X-axis direction differs among points whose Y coordinates are the same and curvature in the Y-axis direction differs among points whose X coordinates are the same. Although the intermediate image includes field curvature and distortion, it is possible to correct field curvature and distortion by using the concave mirror 23 having a free-form surface. Use of the concave mirror 23 having a free-form surface reduces load of aberration correction on the lens system, increases freedom in design, and is advantages for reduction in size.

In the present embodiment, the dustproof glass 26 is disposed between the concave mirror 23 having a free-form surface and the screen SC as an example. On the surface of the dustproof glass 26, a coat having transmission characteristics that differ among regions through which light passes is formed. The dustproof glass 26, which is planar glass, may have curvature or may be an optical element having power, such as a lens. The angle of the dustproof glass 26 may be any angle. For example, the dustproof glass 26 may be disposed perpendicular to the optical axis of the refractive optical system 21 or may be inclined with respect to the optical axis.

Next, an example of the lens structure of the refractive optical system 21 and main parameters of the projection optical apparatus will be described.

Figure 12:
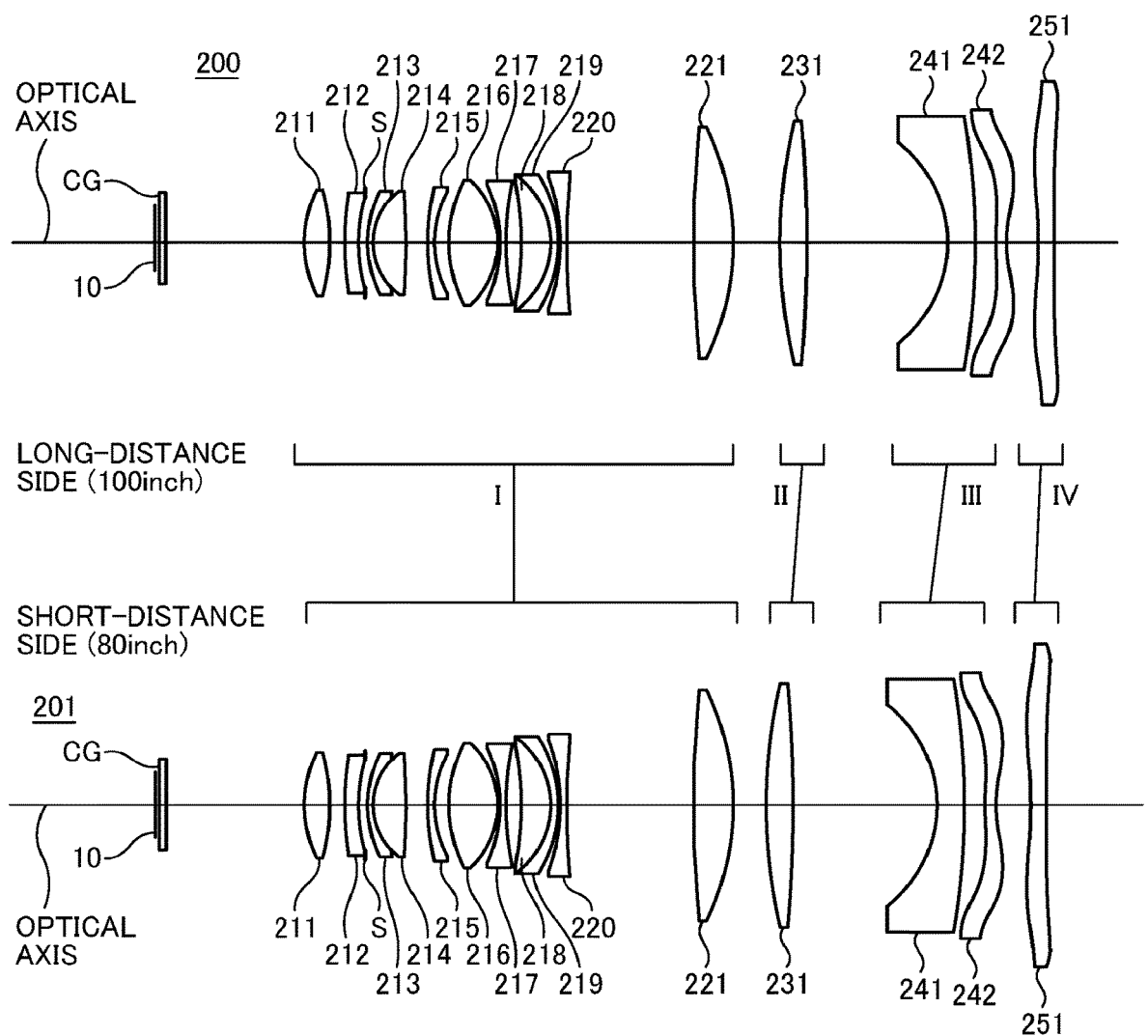
FIG. 12 illustrates an example of the lens structure of a refractive optical system and an example of the lens arrangement in accordance with a focus.

FIG. 12 illustrates an example of the lens structure of the refractive optical system 21 and an example of the lens arrangement in accordance with a focus. FIG. 12 illustrates a lens arrangement (200) when focusing on the long-distance side (100 inches) is performed, and a lens arrangement (201) when focusing on the short-distance side (80 inches) is performed. FIG. 12 also illustrates the image display element 10 in order to illustrate the positional relationship between the image display element 10 and the lenses of the refractive optical system 21.

The refractive optical system 21 illustrated in FIG. 12 includes, in order from the image forming portion LV side of the image display element 10 toward the image magnification side, a first lens group (I) having positive refractive power, a second lens group (II) having positive refractive power, a third lens group (III) having negative refractive power, and a fourth lens group (IV) having negative refractive power.

In order to perform focusing in response to variation in projection distance, for example, when focusing from the long-distance side toward the short-distance side, the positive second lens group (II), the negative third lens group (III), and the negative fourth lens group (IV) move toward the image forming portion LV side. The first lens group (I) is fixed in place relative to the image forming portion LV.

The positive first lens group (I) includes the following lenses, in order from the image forming portion LV side: a biaspheric biconvex lens 211 whose convex surface having a stronger power faces the image forming portion LV side, a negative meniscus lens 212 whose convex surface faces the image forming portion LV side, an aperture stop S, a cemented lens including a negative meniscus lens 213 whose convex surface faces the image forming portion LV side and a biconvex lens 214 whose convex surface having a stronger power faces the image forming portion LV side, a negative meniscus lens 215 whose convex surface faces the image forming portion LV side, a biaspheric biconvex lens 216 whose convex surface having a stronger power faces the magnification side, a biconcave lens 217 whose concave surface having a stronger power faces the magnification side, a cemented lens including a positive meniscus lens 218 whose convex surface faces the magnification side and a negative meniscus lens 219 whose convex surface faces the magnification side, a biconcave lens 220 whose concave surface having a stronger power faces the image forming portion LV side, and a biconvex lens 221 whose convex surface having a stronger power faces the magnification side.

The positive second lens group (II) includes one biconvex lens 231 whose convex surface having a stronger power faces the image forming portion LV side.

The negative third lens group (III) includes a negative meniscus lens 241 whose convex surface faces the magnification side, and a biaspheric negative meniscus resin lens 242 whose convex surface faces the image forming portion LV side.

The negative fourth lens group (IV) includes a biaspheric negative meniscus resin lens 251 whose convex surface faces the magnification side.

The first lens group (I), the second lens group (II), the third lens group (III), and the fourth lens group (1V) are included in the refractive optical system 21. The curvature of the concave mirror 23, having a free-form surface, of the projection optical apparatus 2 (see FIG. 5) is 0.

Data tables are presented below. The tables present data in order of surface numbers from the image forming portion LV side. Surface numbers with "*" indicate aspheric surfaces, and a surface number with "**" indicates a free-form surface.

TABLE 1

Numerical Aperture: 0.290

| | R | D | Nd | vd |
|---|---|---|---|---|
| 1 | ∞ | 1.00 | | |
| 2 | ∞ | 1.05 | 1.50999 | 63.5517 |
| 3 | ∞ | 25.95 | | |
| 4* | 23.834 | 4.60 | 1.49700 | 81.5459 |
| 5* | −38.907 | 2.83 | | |
| 6 | 73.132 | 2.50 | 1.80610 | 40.9298 |
| 7 | 36.097 | 1.41 | | |
| Aperture Stop | ∞ | 0.30 | | |
| 8 | 25.076 | 1.00 | 1.91650 | 31.6041 |
| 9 | 13.785 | 6.05 | 1.53775 | 74.7031 |
| 10 | −162.809 | 3.99 | | |
| 11 | 53.887 | 1.30 | 1.58913 | 61.1350 |
| 12 | 23.300 | 2.59 | | |
| 13* | 26.771 | 9.05 | 1.53775 | 74.7031 |
| 14* | −15.345 | 0.30 | | |
| 15 | −29.716 | 1.20 | 1.81512 | 46.6542 |
| 16 | 64.207 | 2.61 | | |
| 17 | −72.219 | 5.64 | 1.81409 | 24.6709 |
| 18 | −17.683 | 1.40 | 1.80400 | 46.5275 |
| 19 | −27.084 | 0.30 | — | |
| 20 | −42.477 | 1.40 | 1.91650 | 31.6041 |
| 21 | 203.143 | 23.50 | | |
| 22 | 237.174 | 7.60 | 1.58913 | 61.1350 |
| 23 | −56.040 | variable A | | |
| 24 | 110.849 | 5.20 | 1.76179 | 50.3576 |
| 25 | −252.984 | variable B | | |
| 26 | −27.931 | 4.82 | 1.77547 | 38.7150 |
| 27 | −178.742 | 3.81 | | |
| 28* | 55.346 | 2.20 | 1.50966 | 56.4400 |
| 29* | 26.228 | variable C | | |
| 30* | −66.046 | 2.70 | 1.50966 | 56.4400 |
| 31* | −129661.651 | variable D | | |
| 32 | ∞ | −85.74 | reflective surface | |
| 33** | ∞ | variable E | reflective surface | |

TABLE 2

Variable Spacing
Focusing

| | Short Distance | Reference | Long Distance |
|---|---|---|---|
| Screen Size | 60 inches | 80 inches | 100 inches |
| Variable A | 6.00 | 7.45 | 8.40 |
| Variable B | 26.85 | 26.54 | 26.33 |
| Variable C | 6.62 | 6.26 | 6.03 |
| Variable D | 65.89 | 65.11 | 64.60 |
| Variable E | 345.37 | 446.78 | 547.81 |

TABLE 3

Aspherical Coefficients

| | K | A4 | A6 | A8 | A10 | A12 | A14 | A16 |
|---|---|---|---|---|---|---|---|---|
| 4th Surface | −1.0881 | −6.7000E−06 | 7.1500E−09 | | | | | |
| 5th Surface | −5.7738 | −1.5375E−06 | 1.5975E−08 | 6.5230E−10 | | | | |
| 13th Surface | −4.8691 | 2.4250E−05 | −6.3788E−08 | | | | | |
| 14th Surface | −02585 | 4.1950E−05 | −2.8916E−08 | | | | | |
| 28th Surface | −100.0000 | −4.1073E−05 | 7.5444E−08 | −1.3556E−10 | −9.3836E−14 | 2.7708E−16 | −5.02688E−19 | 2.30717E−22 |
| 29th Surface | −14.3657 | −3.8331E−05 | 5.0162E−08 | −5.5366E−11 | 3.1745E−14 | 2.5389E−17 | −2.35063E−20 | |
| 30th Surface | −36.4820 | −4.4798E−07 | 2.9871E−08 | −4.8881E−11 | 3.0349E−14 | −4.0437E−18 | −2.53962E−21 | |
| 31st Surface | 0.0000 | 2.7300E−06 | −6.4935E−09 | 2.5699E−11 | −4.8337E−14 | 3.8860E−17 | −1.20612E−20 | |

TABLE 4

Free-Form Surface Coefficients

33rd Surface

| | |
|---|---|
| K | 0 |
| C4 | 8.7581E−03 |
| C6 | 1.5710E−03 |
| C8 | 7.9021E−05 |
| C10 | −1.3841E−04 |
| C11 | −4.6174E−07 |
| C13 | 6.0531E−06 |
| C15 | 4.4827E−07 |
| C17 | −3.4870E−08 |
| C19 | 1.5472E−07 |
| C21 | 4.4154E−08 |
| C22 | 6.9864E−11 |
| C26 | 1.3753E−09 |
| C28 | 4.3821E−10 |
| C30 | 1.8716E−12 |
| C32 | −5.4566E−11 |
| -C34 | −6.9891E−12 |
| C36 | −8.2661E−13 |
| C37 | −5.2909E−15 |
| C39 | 1.0025E−13 |
| C41 | −6.6689E−13 |
| C43 | −1.5039E−13 |
| C45 | −1.0622E−14 |
| C47 | 8.0624E−17 |
| C49 | 2.4289E−15 |
| C51 | −3.0840E−15 |
| C53 | 5.5299E−17 |
| C55 | 2.9772E−16 |
| C56 | 3.7652E−19 |
| C58 | 2.5027E−18 |
| C60 | 1.8974E−17 |
| C64 | 6.2906E−18 |
| C66 | 2.3508E−18 |

TABLE 5

Projection Distance and TR

| | Short Distance 60 inches | Reference 80 inches | Long Distance 100 inches |
|---|---|---|---|
| Projection Distance | 345.37 | 446.78 | 547.81 |
| TR | 0.260 | 0.252 | 0.247 |

TABLE 6

DMD Size

| | |
|---|---|
| Dot Size Px | 5.4 μm |
| Lateral Length | 10.368 mm |
| Vertical Length | 6.48 mm |
| Optical Axis to Element Center | 4.05 mm |

Table 7 presents the positional coordinates of the concave mirror 23 having a free-form surface from the vertex of a lens that is positioned nearest to the reflective surface 22 in an in-focus state in which a projected image is the largest. Rotation is represented by the angle between a surface normal and the optical axis.

TABLE 7

| | Y-axis | Z-axis | α |
|---|---|---|---|
| 32nd Surface | 0.00 | 64.60 | −45.00 |
| 33rd Surface | 85.74 | 84.25 | −101.77 |

First Modification of Second Embodiment

A modification of the second embodiment will be described. In the following description, differences from the second embodiment will be mainly described, and elements common to the second embodiment and the modification will not be illustrated and described, as appropriate.

Figure 13:
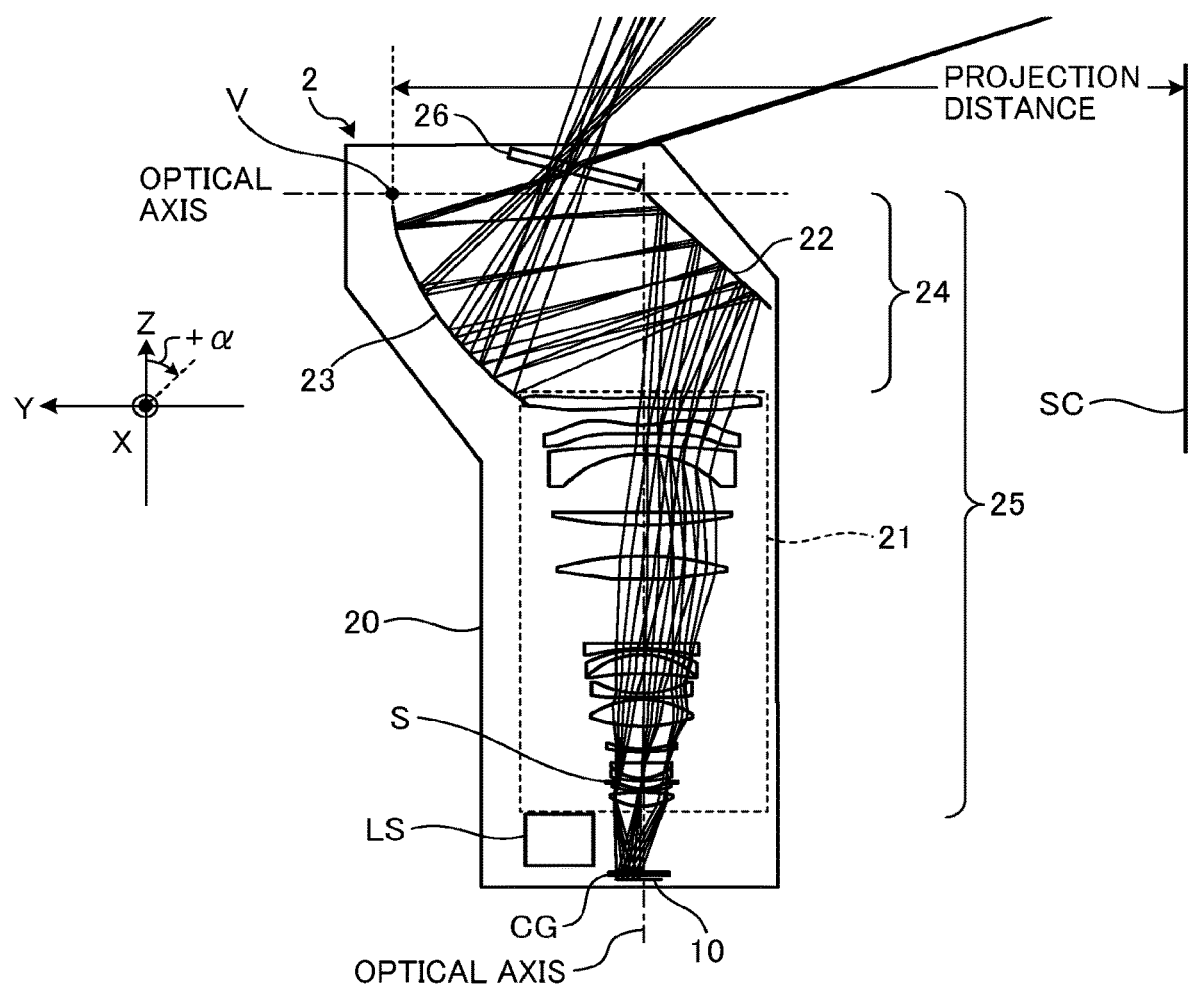
FIG. 13 illustrates an example of a projection optical apparatus according to a first modification of the second embodiment.

FIG. 13 illustrates an example of a projection optical apparatus according to a first modification of the second embodiment. FIG. 13 illustrates the internal structure of the projection optical apparatus. In the refractive optical system 21, a lens arrangement and a light path in a case of 100 inches are illustrated. The first modification differs from the projection optical apparatus according to the second embodiment in the lens structure of the refractive optical system 21.

Figure 14:
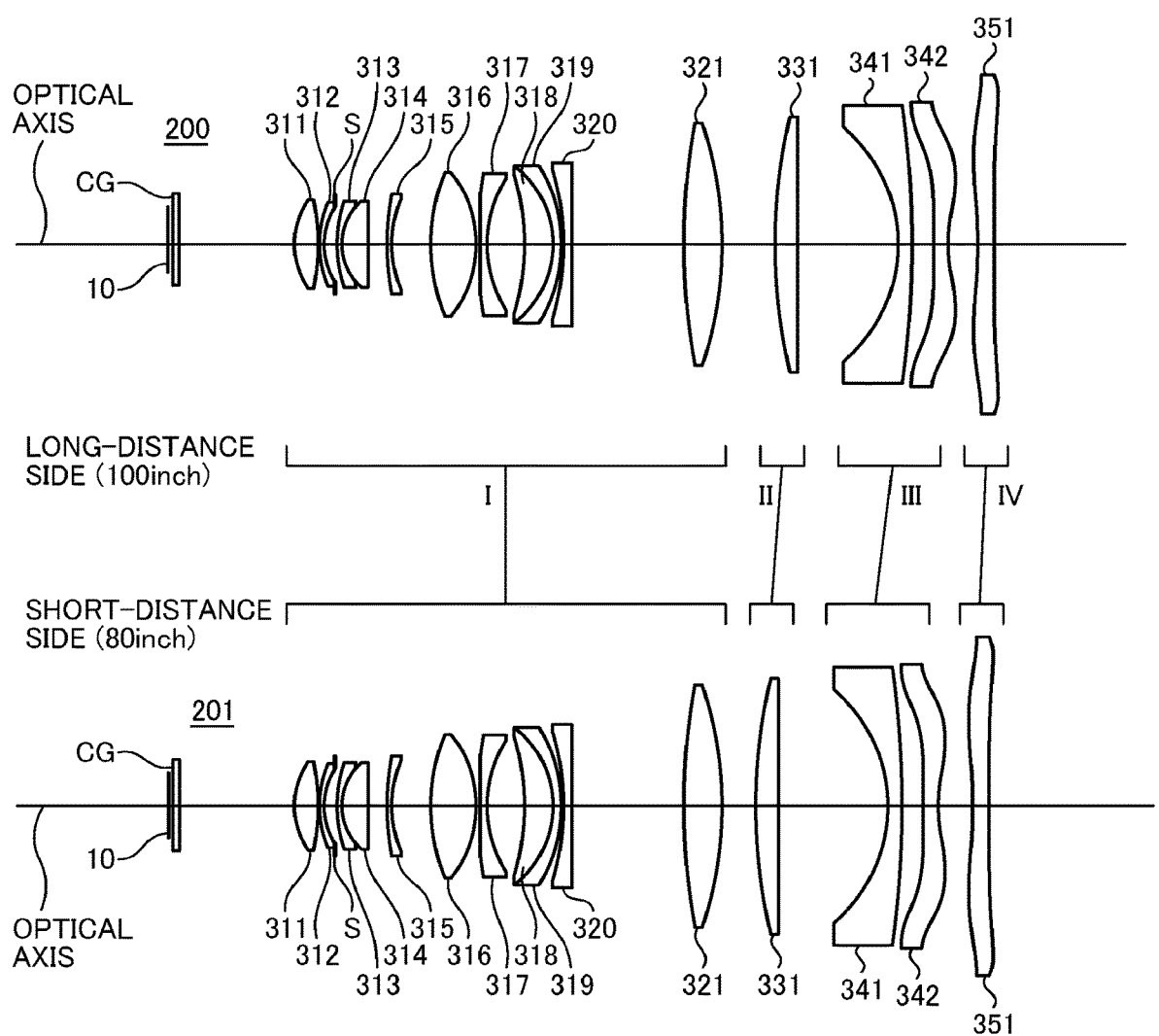
FIG. 14 illustrates an example of the lens structure of a refractive optical system according to the first modification and an example of the lens arrangement in accordance with a focus.

FIG. 14 illustrates an example of the lens structure of the refractive optical system 21 according to the first modification and an example of the lens arrangement in accordance with a focus. FIG. 14 illustrates a lens arrangement 200 when focusing on the long-distance side (100 inches) is performed, and a lens arrangement 201 when focusing on the short-distance side (80 inches) is performed.

The lens structure illustrated in FIG. 14, including a positive first lens group (I), a positive second lens group (II), a negative third lens group (III), and a negative fourth lens group (IV), will be described.

The positive first lens group (I) includes the following lenses, in order from the image forming portion LV side: a biaspheric biconvex lens 311 whose convex surface having a stronger power faces the image forming portion LV side, a negative meniscus lens 312 whose convex surface faces the image forming portion LV side, an aperture stop S, a cemented lens including a negative meniscus lens 313 whose convex surface faces the image forming portion LV side and a plano-convex lens 314 whose convex surface faces the image forming portion LV side, a negative meniscus lens 315 whose convex surface faces the image forming portion LV side, a biaspheric biconvex lens 316 whose convex surface having a stronger power faces the magnification side, a negative meniscus lens 317 whose convex surface faces the image forming portion LV side, a cemented lens including a negative meniscus lens 318 whose convex surface faces the magnification side and a negative meniscus lens 319 whose convex surface faces the magnification side, a biconcave lens 320 whose concave surface having a stronger power faces the image forming portion LV side, and a biconvex lens 321 whose convex surface having a stronger power faces the magnification side.

The positive second lens group (II) includes one biconvex lens 331 whose convex surface having a stronger power faces the image forming portion LV side.

The negative third lens group (III) includes a negative meniscus lens 341 whose convex surface faces the magnification side, and a biaspheric negative meniscus resin lens 342 whose convex surface faces the image forming portion LV side.

The negative fourth lens group (IV) includes a biaspheric negative meniscus resin lens 351 whose convex surface faces the magnification side.

The curvature of the concave mirror 23, having a free-form surface, of the projection optical apparatus 2 (see FIG. 13) is 0.

Data tables are presented below. The tables present data in order of surface numbers from the image forming portion LV side. Surface numbers with "*" indicate aspheric surfaces, and a surface number with "**" indicates a free-form surface.

TABLE 8

Numerical Aperture: 0.290

|  | R | D | Nd | vd |
|---|---|---|---|---|
| 1 | ∞ | 1.00 | | |
| 2 | ∞ | 1.05 | 1.50999 | 63.5517 |
| 3 | ∞ | 21.45 | — | |
| 4* | 15.625 | 4.20 | 1.49700 | 81.5459 |
| 5* | −46.696 | 0.30 | | |
| 6 | 24.078 | 0.90 | 1.80610 | 40.9298 |
| 7 | 16.831 | 1.99 | | |
| Aperture Stop | ∞ | 0.30 | | |
| 8 | 24.499 | 0.90 | 1.91650 | 31.6041 |
| 9 | 12.524 | 4.90 | 1.53775 | 74.7031 |
| 10 | ∞ | 3.65 | | |
| 11 | 91.040 | 1.20 | 1.54180 | 62.9637 |
| 12 | 27.894 | 6.87 | | |
| 13* | 33.680 | 8.82 | 1.53775 | 74.7031 |
| 14* | −20.991 | 0.30 | | |
| 15 | 195.794 | 1.40 | 1.72201 | 48.6041 |
| 16 | 27.635 | 6.96 | | |
| 17 | −55.668 | 5.64 | 1.82685 | 24.3077 |

TABLE 8-continued

Numerical Aperture: 0.290

|  | R | D | Nd | vd |
|---|---|---|---|---|
| 18 | −20.404 | 1.60 | 1.80400 | 46.5275 |
| 19 | −31.044 | 0.30 | | |
| 20 | −65.183 | 1.60 | 1.84646 | 23.7899 |
| 21 | 719.271 | 20.45 | | |
| 22 | 116.371 | 7.60 | 1.58909 | 61.1365 |
| 23 | −82.612 | variable A | | |
| 24 | 124.792 | 4.07 | 1.74100 | 52.6365 |
| 25 | −1345.419 | variable B | | |
| 26 | −31.838 | 2.80 | 1.77751 | 38.9982 |
| 27 | −232.577 | 3.66 | | |
| 28* | 54.270 | 2.66 | 1.50966 | 56.4400 |
| 29* | 25.908 | variable C | | |
| 30* | −65.731 | 2.70 | 1.50966 | 56.4400 |
| 31* | −129661.651 | variable D | | |
| 32 | ∞ | −71.62 | reflective surface | |
| 33** | ∞ | variable E | reflective surface | |

TABLE 9

Variable Spacing Focusing

|  | Short Distance | Reference | Long Distance |
|---|---|---|---|
| Screen Size | 60 inches | 80 inches | 100 inches |
| Variable A | 6.00 | 8.42 | 9.80 |
| Variable B | 20.32 | 19.21 | 18.54 |
| Variable C | 7.01 | 6.34 | 6.01 |
| Variable D | 67.70 | 67.06 | 66.68 |
| Variable E | 345.44 | 447.12 | 548.03 |

TABLE 10

Aspherical Coefficients

| | K | A4 | A6 | A8 | A10 | A12 | A14 | A16 |
|---|---|---|---|---|---|---|---|---|
| 4th Surface | −0.2801 | −2.0606E−05 | 3.9276E−08 | | | | | |
| 5th Surface | −2.7287 | −2.4950E−05 | 1.9242E−08 | | | | | |
| 13th Surface | −6.9115 | 1.1571E−05 | −2.8649E−08 | | | | | |
| 14th Surface | 0.0079 | 2.0931E−05 | −1.3427E−08 | | | | | |
| 28th Surface | −77.8856 | −3.1308E−05 | 3.1619E−08 | 3.1255E−11 | −2.0383E−13 | 4.0130E−16 | −3.45252E−19 | 1.08819E−22 |
| 29th Surface | −11.8460 | −3.2193E−05 | 2.8598E−08 | 1.1209E−11 | −8.4502E−14 | 1.0842E−16 | −4.42143E−20 | |
| 30th Surface | −23.2043 | 3.7445E−06 | 2.1331E−08 | −4.6703E−11 | 4.2952E−14 | −1.9952E−17 | 3.47061E−21 | |
| 31st Surface | 0.0000 | 9.2232E−07 | 6.3798E−09 | −8.2942E−12 | −8.0276E−16 | 4.6009E−18 | −2.02055E−21 | |

TABLE 11

Free-Form Surface Coefficients

| | 33rd Surface |
|---|---|
| K | 0 |
| C4 | 9.2621E−03 |
| C6 | 1.2158E−03 |
| C8 | 1.0161E−04 |
| C10 | −1.3979E−04 |
| C11 | −6.6045E−07 |
| C13 | 6.4543E−06 |
| C15 | 4.6710E−07 |
| C17 | −5.4876E−08 |
| C19 | 1.5321E−07 |
| C21 | 4.3609E−08 |
| C22 | 1.1494E−10 |
| C26 | 1.2957E−09 |
| C28 | 4.3651E−10 |
| C30 | 5.5552E−12 |
| C32 | −6.5136E−11 |
| C34 | −7.4749E−12 |
| C36 | −7.7307E−13 |

TABLE 11-continued

Free-Form Surface Coefficients

33rd Surface

| | |
|---|---|
| C37 | −6.6786E−15 |
| C39 | 2.3029E−13 |
| C41 | −7.1572E−13 |
| C43 | −1.5486E−13 |
| C45 | −1.1197E−14 |
| C47 | 7.4797E−17 |
| -C49 | 4.5599E−15 |
| C51 | −2.6523E−15 |
| C53 | −1.5599E−17 |
| C55 | 2.9846E−16 |
| C56 | 4.8622E−19 |
| C58 | 3.0246E−18 |
| C60 | 3.2451E−17 |
| C64 | 6.2963E−18 |
| C66 | 2.4857E−18 |

TABLE 12

Projection Distance and TR

| | Short Distance 60 inches | Reference 80 inches | Long Distance 100 inches |
|---|---|---|---|
| Projection Distance | 345.44 | 447.12 | 548.03 |
| TR | 0.260 | 0.252 | 0.248 |

TABLE 13

DMD Size

| | |
|---|---|
| Dot Size Px | 5.4 μm |
| Lateral Length | 10.368 mm |
| Vertical Length | 6.48 mm |
| Optical Axis to Element Center | 4.05 mm |

Table 14 presents the positional coordinates of the concave mirror 23 having a free-form surface from the vertex of a lens that is positioned nearest to the reflective surface 22 in an in-focus state in which a projected image is the largest. Rotation is represented by the angle between a surface normal and the optical axis.

TABLE 14

| | Y-axis | Z-axis | α |
|---|---|---|---|
| 32nd Surface | 0.00 | 66.68 | −45.00 |
| 33rd Surface | 71.62 | 86.23 | −100.79 |

Second Modification of Second Embodiment

Another modification of the second embodiment will be described.

Figure 15:
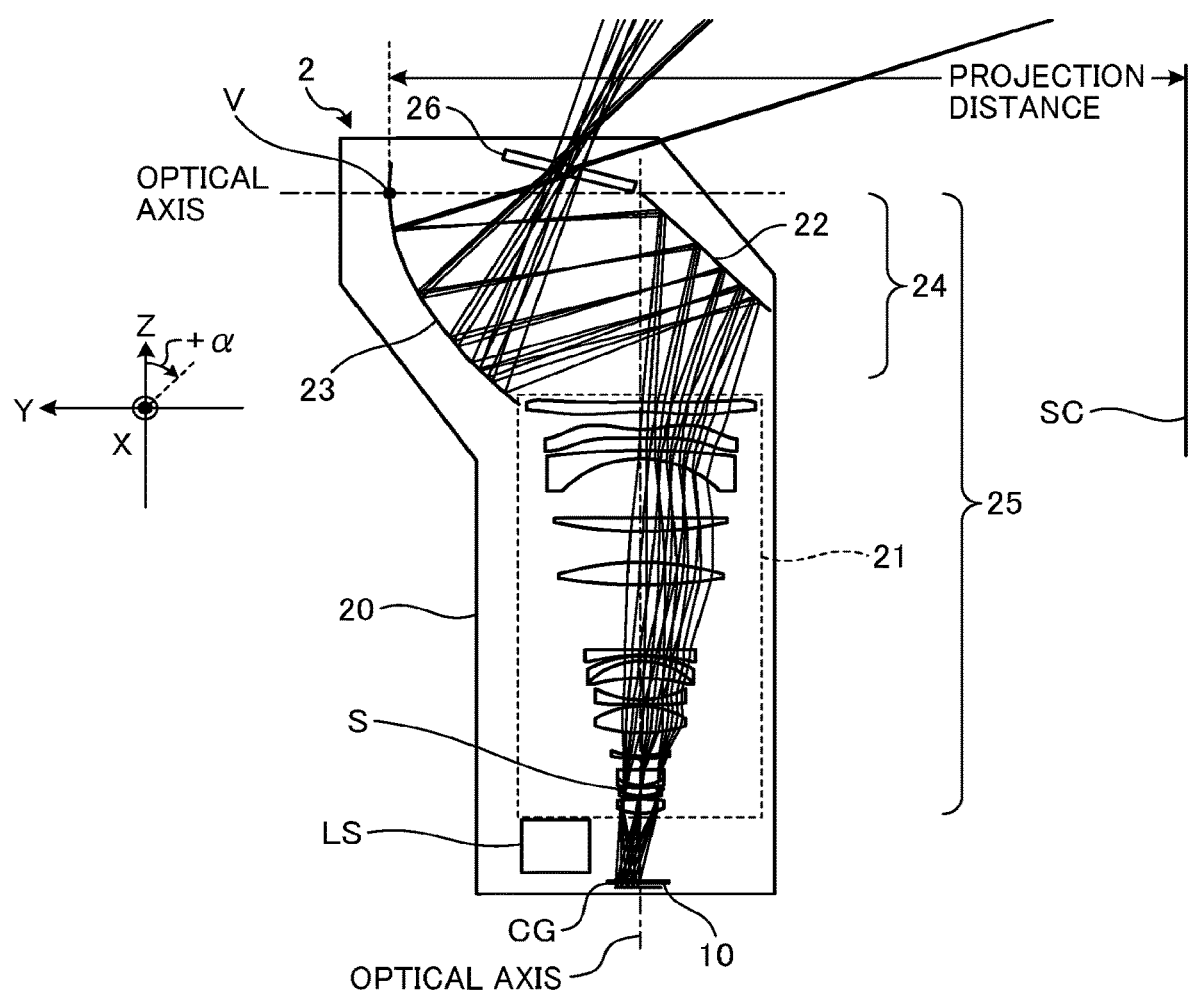
FIG. 15 illustrates an example of a projection optical apparatus according to a second modification of the second embodiment.
Figure 16:
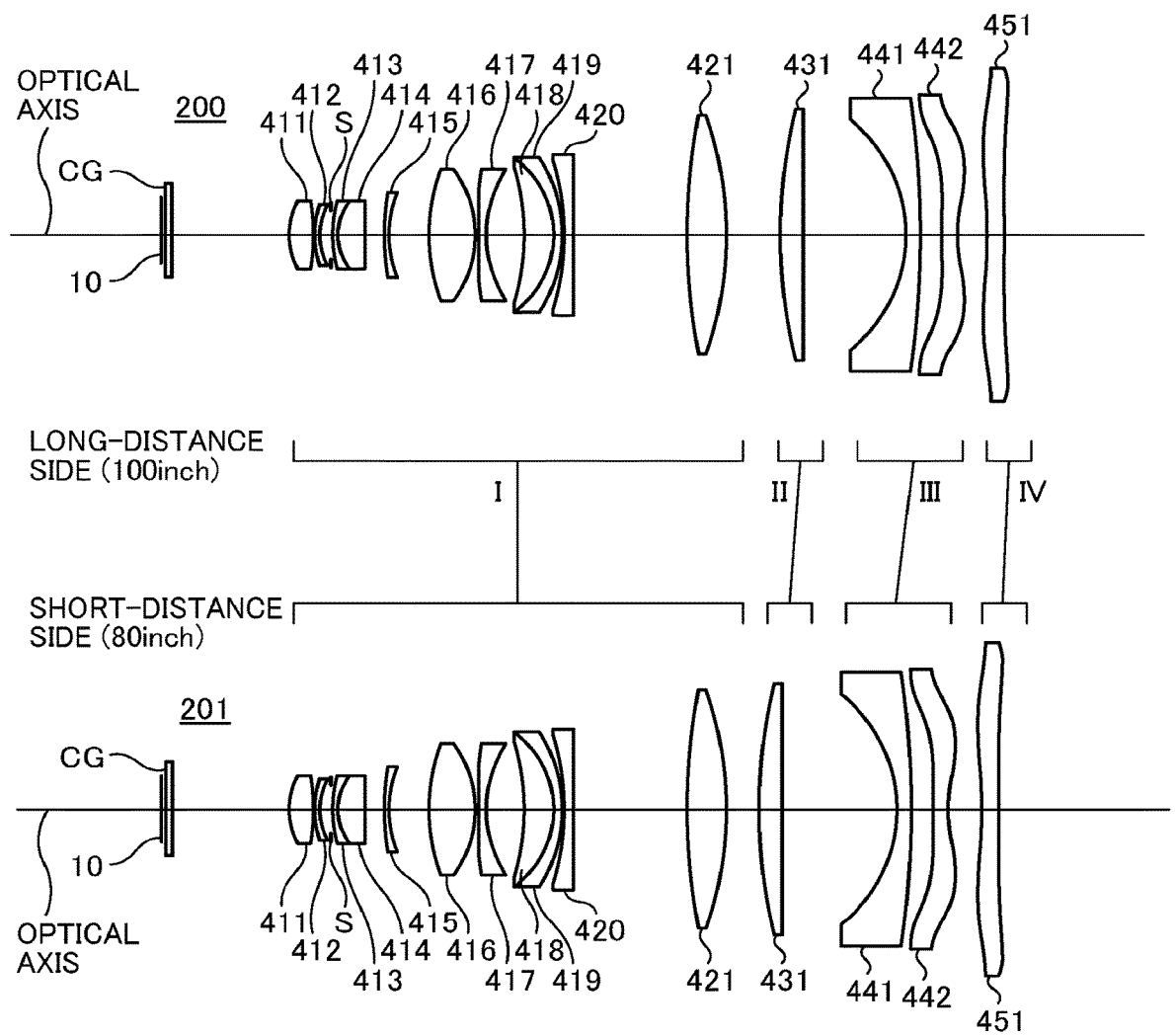
FIG. 16 illustrates an example of the lens structure of a refractive optical system according to the second modification and an example of the lens arrangement in accordance with a focus.

FIG. 15 illustrates an example of a projection optical apparatus according to a second modification of the second embodiment. FIG. 16 illustrates an example of the lens structure of the refractive optical system 21 according to the second modification and an example of the lens arrangement in accordance with a focus. The second modification differs from the first modification in the lens diameter of the refractive optical system 21 of the projection optical apparatus.

In FIG. 16, the positive first lens group (I) includes the following lenses, in order from the image forming portion LV side: a biaspheric biconvex lens 411 whose convex surface having a stronger power faces the image forming portion LV side, a negative meniscus lens 412 whose convex surface faces the image forming portion LV side, an aperture stop S, a cemented lens including a negative meniscus lens 413 whose convex surface faces the image forming portion LV side and a plano-convex lens 414 whose convex surface faces the image forming portion LV side, a negative meniscus lens 415 whose convex surface faces the image forming portion LV side, a biaspheric biconvex lens 416 whose convex surface having a stronger power faces the magnification side, a negative meniscus lens 417 whose convex surface faces the image forming portion LV side, a cemented lens including a negative meniscus lens 418 whose convex surface faces the magnification side and a negative meniscus lens 419 whose convex surface faces the magnification side, a biconcave lens 420 whose concave surface having a stronger power faces the image forming portion LV side, and a biconvex lens 421 whose convex surface having a stronger power faces the magnification side.

The positive second lens group (II) includes one biconvex lens 431 whose convex surface having a stronger power faces the image forming portion LV side.

The negative third lens group (III) includes a negative meniscus lens 441 whose convex surface faces the magnification side, and a biaspheric negative meniscus resin lens 442 whose convex surface faces the image forming portion LV side.

The negative fourth lens group (IV) includes a biaspheric negative meniscus resin lens 451 whose convex surface faces the magnification side.

In the figures, the NA of the refractive optical system 21 is 0.238, and the outside diameters of lenses are changed in accordance with the NA. In other respects, the second modification is the same as the first modification of the second embodiment. Further descriptions of the second modification, which are the same as those of the first modification of the second embodiment, will be omitted.

Table 15 presents examples of the values of parameters in the second embodiment, the first modification, and the second modification. Table 16 presents the values of the conditional expressions when these values of the parameters are input.

TABLE 15

| Parameter | Second Embodiment | First Modification | Second Modification |
|---|---|---|---|
| θ1 | 17 | 17 | 17 |
| EP | 39.0 | 30.1 | 30.1 |
| Ym | 6.48 | 6.48 | 6.48 |
| θ2 | 39 | 38.5 | 38.5 |
| U | 22 | 18.6 | 14.4 |
| BF | 28 | 23 | 23 |
| NA | 0.29 | 0.29 | 0.238 |
| Lcg | 110 | 110 | 135 |
| Lm | 140 | 132 | 130 |

TABLE 16

| | Second Embodiment | First Modification | Second Modification |
|---|---|---|---|
| Conditional Expression (1) | 17 | 17 | 17 |
| Conditional Expression (2) | 6.0 | 4.6 | 4.6 |
| Conditional Expression (3) | 39.0 | 38.5 | 38.5 |
| Conditional Expression (4) | 0.79 | 0.81 | 0.63 |
| Conditional Expression (5) | 0.29 | 0.29 | 0.238 |

TABLE 16-continued

| | Second Embodiment | First Modification | Second Modification |
|---|---|---|---|
| Conditional Expression (6) | 0.26 | 0.26 | 0.26 |
| Conditional Expression (7) | 0.79 | 0.83 | 1.04 |

The values of the conditional expressions (1) to (7) for the second embodiment, the first modification, and the second modification, which are listed in Table 16, are within the ranges of the conditional expressions (1) to (7) described above. Accordingly, by setting the parameters at the values presented in Table 15, it is possible to reduce size and increase efficiency. Tables 16 and 15 also include values to be set for a projection optical unit and a projection optical system. By setting the projection optical unit and the projection optical system as listed in Table 15, it is possible to reduce size and increase efficiency.

As described above, when an appropriate pupil distance and inclination of micromirrors satisfy the conditional expressions in the projection optical system unit, the projection optical system, and the projection optical apparatus described in the embodiments and the modifications, it is possible to reduce size and increase efficiency.

The embodiments and the modifications are examples of a projection optical system unit, a projection optical system, and a projection optical apparatus. The structures of a projection optical system unit, a projection optical system, and a projection optical apparatus are not limited to these examples.

In particular, the shapes of elements and values are examples, and may be changed, as appropriate, within the gist described in the embodiments and the modifications.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A projection optical system unit comprising:
a reflective image display element that includes a plurality of micromirrors, the image display element having an image display surface on which the plurality of micromirrors are two-dimensionally arranged and being configured to change an angle of a reflective surface of each of the micromirrors with respect to a line normal to the image display surface to form an image; and
a projection optical system that includes a plurality of lenses and an aperture stop, the projection optical system being configured to magnify and project an image formed by the image display element onto a projection surface,
wherein the projection optical system unit satisfies $\theta 1 \geq 15°$ and $3 < EP/Ym < 7$, where $\theta 1$ is a maximum inclination angle of the line normal to the reflective surface of each of the micromirrors,
EP is an entrance pupil distance of the projection optical system, and
Ym is a maximum distance in a plane from an optical axis to a point on the image display surface, the plane being a plane in which a light ray propagating from a center of the image display surface toward the projection surface through a center of the aperture stop of the projection optical system exists, the optical axis being an axis shared by a largest number of the plurality of lenses of the projection optical system, the point corresponding to an image on the projection surface.

2. The projection optical system unit according to claim 1, further comprising:
an illumination optical system configured to illuminate the image display surface,
wherein $\theta 2 > 30°$ is satisfied, where $\theta 2$ is an angle, with respect to the line normal to the image display surface, of a straight line connecting the center of the image display surface and a surface vertex of an optical element of the illumination optical system, the optical element being nearest to the image display surface and having power.

3. The projection optical system unit according to claim 2, wherein an orthogonal projection of the straight line onto the image display surface is parallel to or perpendicular to a long side of the image display surface, the straight line connecting the center of the image display surface and the surface vertex of the optical element of the illumination optical system, the optical element being nearest to the image display surface and having power.

4. The projection optical system unit according to claim 2, further comprising:
a flat plate on a light path from the image display surface to the projection optical system,
wherein, in the projection optical system into which illumination light emitted from the illumination optical system and reflected by the image display surface enters by way of the flat plate, an entrance pupil through which the illumination light enters is located away from the image display surface by a lens.

5. The projection optical system unit according to claim 1, wherein $0.35 < U/BF < 0.85$ is satisfied,
where BF is a distance along the optical axis between the image display surface and a vertex of a lens surface that is nearest to the image display surface in the projection optical system, and U is an outside diameter of a lens that has the lens surface nearest to the image display surface.

6. The projection optical system unit according to claim 1, wherein $NA > 0.17$ is satisfied,
where NA is a numerical aperture of the projection optical system.

7. The projection optical system unit according to claim 1, wherein the projection optical system includes, in order from the image display surface side,
a refractive optical system including the plurality of lenses and the aperture stop, and
a reflective optical system including at least one reflective surface having power.

8. The projection optical system unit according to claim 7, wherein $TR < 0.5$ is satisfied,
where TR is (a distance from an intersection of a reflective surface nearest to a magnification side and the optical axis in the reflective surface to a screen onto which the image is magnified and projected)/(a lateral width of the screen).

9. The projection optical system unit according to claim 7, wherein the reflective surface having power is a concave surface.

10. The projection optical system unit according to claim 7, wherein the reflective surface having power has a free-form surface shape.

11. The projection optical system unit according to claim 7, further comprising:

a dustproof glass between a screen and the reflective surface having power, wherein reflection characteristics with respect to an angle of incidence of light on the dustproof glass differ among regions of the dustproof glass.

12. The projection optical system unit according to claim 11, wherein $0.5 < Lcg/Lm < 1.8$ is satisfied, where Lcg is a length of the dustproof glass, and Lm is a length of the reflective surface having power.

13. The projection optical system unit according to claim 7, wherein the projection optical system further includes at least one reflective surface between the refractive optical system and the reflective surface having power, and a light path is bent.

14. The projection optical system unit according to claim 1, wherein, in the projection optical system, the aperture stop is disposed between at least two lenses.

15. The projection optical system unit according to claim 1, wherein the image display surface does not intersect the optical axis.

16. The projection optical system unit according to claim 1, wherein a lens group of the refractive optical system, the lens group being nearest to the image display surface, has positive refractive power.

17. A projection optical system for use in a projection optical apparatus including a reflective image display element that includes a plurality of micromirrors, the image display element having an image display surface on which the plurality of micromirrors are two-dimensionally arranged and being configured to change an angle of a reflective surface of each of the micromirrors with respect to a line normal to the image display surface to form an image, the projection optical system including a plurality of lenses and an aperture stop and being configured to magnify and project an image formed by the image display element onto a projection surface, wherein the projection optical system satisfies, $\theta 1 \geq 15°$ and $3 < EP/Ym < 7$, where $\theta 1$ is a maximum inclination angle of the line normal to the reflective surface of each of the micromirrors, EP is an entrance pupil distance of the projection optical system, and Ym is a maximum distance in a plane from an optical axis to a point on the image display surface, the plane being a plane in which a light ray propagating from a center of the image display surface toward the projection surface through a center of the aperture stop of the projection optical system exists, the optical axis being an axis shared by a largest number of the plurality of lenses of the projection optical system, the point corresponding to an image on the projection surface.

18. A projection optical apparatus for magnifying and projecting an image onto a screen, the projection optical apparatus comprising:

a reflective image display element that includes a plurality of micromirrors, the image display element having an image display surface on which the plurality of micromirrors are two-dimensionally arranged and being configured to change an angle of a reflective surface of each of the micromirrors with respect to a line normal to the image display surface to form an image; and a projection optical system that includes a plurality of lenses and an aperture stop, the projection optical system being configured to magnify and project an image formed by the image display element onto a projection surface, wherein the projection optical apparatus satisfies $\theta > 15°$ and $3 < EP/Ym < 7$, where $\theta 1$ is a maximum inclination angle of the line normal to the reflective surface of each of the micromirrors, EP is an entrance pupil distance of the projection optical system, and Ym is a maximum distance in a plane from an optical axis to a point on the image display surface, the plane being a plane in which a light ray propagating from a center of the image display surface toward the projection surface through a center of the aperture stop of the projection optical system exists, the optical axis being an axis shared by a largest number of the plurality of lenses of the projection optical system, the point corresponding to an image on the projection surface.

* * * * *